(12) United States Patent  (10) Patent No.: US 8,718,064 B2
Beliveau et al.  (45) Date of Patent: *May 6, 2014

(54) FORWARDING ELEMENT FOR FLEXIBLE AND EXTENSIBLE FLOW PROCESSING SOFTWARE-DEFINED NETWORKS

(75) Inventors: Ludovic Beliveau, San Jose, CA (US); Eric Dyke, Ville Saint-Laurent (CA); Ramesh Mishra, San Jose, CA (US); Ritun Patney, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 40 days.

This patent is subject to a terminal disclaimer.

(21) Appl. No.: 13/335,902

(22) Filed: Dec. 22, 2011

(65) Prior Publication Data

US 2013/0163426 A1  Jun. 27, 2013

(51) Int. Cl.
*H04L 12/28* (2006.01)

(52) U.S. Cl.
USPC ............. 370/392; 370/395.31; 370/395.32

(58) Field of Classification Search
USPC ............. 370/231, 389, 392, 395.3, 395.21, 370/395.31, 398, 395.32
See application file for complete search history.

(56) References Cited

U.S. PATENT DOCUMENTS

| 7,447,167 | B2 | 11/2008 | Nadeau et al. | |
|---|---|---|---|---|
| 7,526,480 | B2 | 4/2009 | Nadeau et al. | |
| 7,583,593 | B2 | 9/2009 | Guichard et al. | |
| 7,599,303 | B2 | 10/2009 | Nadeau et al. | |
| 7,746,793 | B2 | 6/2010 | Nadeau et al. | |
| 7,782,790 | B1 | 8/2010 | Nadeau et al. | |
| 7,808,919 | B2 | 10/2010 | Nadeau et al. | |
| 7,839,847 | B2 | 11/2010 | Nadeau et al. | |
| 7,912,934 | B1 | 3/2011 | Melton et al. | |
| 2003/0167340 | A1* | 9/2003 | Jonsson | 709/238 |
| 2004/0190526 | A1 | 9/2004 | Kumar et al. | |
| 2006/0136487 | A1 | 6/2006 | Kim et al. | |
| 2007/0127375 | A1 | 6/2007 | Bae et al. | |
| 2008/0013549 | A1* | 1/2008 | Okagawa et al. | 370/397 |
| 2008/0037546 | A1* | 2/2008 | Ishikawa et al. | 370/392 |
| 2008/0279185 | A1* | 11/2008 | Zhang et al. | 370/392 |
| 2009/0063846 | A1 | 3/2009 | Baker et al. | |
| 2010/0329253 | A1* | 12/2010 | Srinivasan et al. | 370/390 |
| 2012/0155467 | A1* | 6/2012 | Appenzeller | 370/392 |
| 2012/0275466 | A1 | 11/2012 | Bhadra et al. | |

OTHER PUBLICATIONS

"Data Center Markup Language Framework Specification", May 5, 2004, 34 pages, Draft, Version 0.11, dcml Inc., downloaded from http://www.dcml.org/technical_info/pdf/frameworkspecification.pdf on Oct. 5, 2011.

(Continued)

*Primary Examiner* — Gary Mui
*Assistant Examiner* — Kabir Jahangir
(74) *Attorney, Agent, or Firm* — Blakely Sokoloff Taylor & Zafman LLP

(57) ABSTRACT

A network device acting as a forwarding element within a software-defined network receives a representation of configurable flow table definitions and configurable logic for selecting between flow tables. The network device creates a flow table based on each of the configurable flow table definitions and installs the configurable logic for selecting between flow tables. The network device receives data to populate configurable key columns and action columns of the flow tables and populates the flow tables using that data. The network device then selects from forwarding decisions for packets according to the configurable logic for selecting between flow tables, the flow tables, and each packet's values in relevant header fields required by the configurable logic.

20 Claims, 9 Drawing Sheets

(56) References Cited

OTHER PUBLICATIONS

"DCML Framework Use Cases", 6 pages, downloaded from http://www.dcml.org/whitepapers/DCML_Use_Cases.pdf on Oct. 5, 2011.

Rama Mwikalo, "Efficient packet header parsing using an embedded configurable packet engine", Mar. 1, 2008, 7 pages, downloaded from http://www.techdesignforums.com/eda/volumes/volume-5/march-2008/eff . . . on Oct. 5, 2011.

"OpenFlow Switch Specication", Feb. 28, 2011, 56 pages, Version 1.1.0 Implemented (Wire Protocol 0x02), downloaded from http://www.openflow.org/documents/openflow-spec-v1.1.0.pdf on Sep. 26, 2011.

Nick McKeown et al., "OpenFlow: Enabling Innovation in Campus Networks", Mar. 14, 2008, 6 pages, downloaded from http://www.openflow.org/documents/openflow-wp-latest.pdf on Sep. 26, 2011.

"XSLT", 10 pages, downloaded from http://en.wikipedia.org/wiki/XSLT on Oct. 5, 2011.

Navindra Yadav et al., "OF1.2 Extensibility Proposal", Jul. 14, 2011, 37 pages, Google, Inc., dowloaded from http://goo.gl/MDRRx on Dec. 22, 2011.

Navindra Yadav et al., "Use Cases Built on top of Open Flow 2.0 Forwarding Model Proposal", Sep. 15, 2011, 25 pages, Google, Inc., dowloaded from http://goo.gl/HaHci on Dec. 22, 2011.

Non-Final Office Action, U.S. Appl. No. 13/335,900, dated May 22, 2013, 35 pages.

Notice of Allowance, U.S. Appl. No. 13/335,903, dated Apr. 26, 2013, 27 pages.

* cited by examiner

```
header etherv2 {
    mac_addr_t  dst_addr;
    mac_addr_t  src_addr;
    int16_t     ether_type;
} header mpls {
    field       ttl:8;
    field       bos:1;
    field       tc:3;
    field       label:20;
} header ipv4 length = hlen * 4 {
    field       version:4;
    field       hlen:4;
    int8_t      tos;
    int16_t     len;
    int16_t     id;
    field       flags:3;
    field       offset:13;
    int8_t      ttl;
    int8_t      proto;
    int16_t     chksum;
    uint32_t    src_addr;
    uint32_t    dst_addr;
} header udp {
    uint16_t    src_port;
    uint16_t    dst_port;
    uint16_t    len;
    uint16_t    chksum;
} header tcp length = offset * 4 {
    uint16_t    src_port;
    uint16_t    dst_port;
    uint32_t    seq;
    uint32_t    ack;
    field       offset:4;
    field       reserved:3;
    field       ecn:3;
    field       control_bits:6;
    uint16_t    window;
    uint16_t    chksum;
    uint16_t    urgent;
}
```

904

```
table 0 {
    field 0 {exact}  mpls[0].label;
    field 1 {exact}  mpls[1].label;
} table 1 {
    field 0 {exact}  etherv2.dst;
    field 1 {exact}  etherv2.src;
    field 2 {lpm}    ipv4.src_addr;
    field 3 {lpm}    ipv4.dst_addr;
    field 4 {exact}  ?
        udp : udp.dst_port,
        tcp : tcp.dst_port;
    field 5 {exact}  ?
        udp : udp.src_port,
        tcp : tcp.src_port;
}
```

902

```
stack etherv2.ether_type {
    0x8847 next mpls;
    0x0800 next ipv4;
} stack ipv4.proto {
    table 1;
    0x11 next udp;
    0x06 next tcp;
} stack mpls.bos stackable {
    table 0;
    0 next mpls;
}
```

FORWARDING ELEMENT FOR FLEXIBLE AND EXTENSIBLE FLOW PROCESSING SOFTWARE-DEFINED NETWORKS

FIELD

Embodiments of the invention relate to the field of networking; and more specifically, to a flexible and extensible flow processing architecture for software-defined networks.

BACKGROUND

For decades, the use of traditional circuit-based communication networks has declined in favor of packet-based networks, which can be more flexible, efficient, and secure. As a result, the increased popularity of packet-based networking has led to growth in demand for packet-based network devices. This demand has largely been met by manufacturers who create larger and larger monolithic routers to handle an increased volume and complexity of network traffic. However, this model is approaching its technologic and economic limits. It is increasingly difficult to fulfill the increasing performance requirements with traditional router designs, and, with the emergence of low cost data center hardware, router vendors have difficulties justifying the higher costs of hardware for the same performance. At the same time, the demands on the routing and switching control plane in access and aggregation networks are becoming more complex. Operators want the ability to customize routing to handle specific kinds of traffic flows near the edge, configure customized services that span aggregation networks, and achieve multi-layer integration, without the detailed low-level configuration typical of today's networks.

These trends led to a different approach to routing architecture, in which data and control planes are decoupled. With this separation, the control plane may be logically centralized and implemented with a variety of hardware components with varied architectures. Further, the data plane may consist of simplified switch/router elements configured by the logically centralized controller. This new routing split-architecture model focuses on the split of control from forwarding and data processing elements and is at the core of software-defined networking (SDN). One standard for flow processing in software-defined networks is OpenFlow, which defines the protocols used to transport messages between the control plane and the forwarding plane and describes a model for packet processing.

This split-architecture of software-defined networks enables a separation between functionalities that can be logically or physically grouped together. For example, there can be a split or separation between a common control entity and a network application (e.g., Generalized Multi-Protocol Label Switching (GMPLS), Border Gateway Protocol (BGP), Internet Protocol Security (IPSec), etc.). Similarly, there can be a split or separation between control and forwarding/processing (i.e. a separation of central control from network devices performing packet processing). There also can be a split or separation of a data forwarding functionality, a data processing functionality, and a data generation functionality (e.g., Deep Packet Inspection (DPI); Ciphering; Operations, administration and management (OAM); etc.).

Software-defined networks present many advantages over traditional monolithic architecture networks. For example, the control plane applications that implement important network routing and switching functionalities are completely separated from the forwarding plane. Thus, maintaining a centralized control plane enables highly customized and optimized networking services that can be tailored to specific user needs. A centralized control plane provides a highly scalable, reliable, and flexible networking infrastructure that can cater to diverse user needs. The forwarding plane (or data plane) devices can be inexpensive and interchangeable commodity networking devices, which reduces the overall configuration and maintenance burdens for the user. Additionally, a single management and configuration entity for the entire network enhances the ease-of-use experience for users.

However, current SDN configurations also suffer from shortcomings. While systems such as OpenFlow do present valid ways to specify a model for packet processing, a problem exists in that it is very hard to extend or customize this model according to particular routing needs. For example, adding support for new protocols requires proposing changes to the OpenFlow specification, hoping for adoption, and waiting for implementation. Such changes involve modifying the parsing, the classification (since the number of fields to be parsed must have changed) and the actions (e.g., for modifying the header of the new protocol) for the packet processing model.

Another drawback of current SDN packet processing models is that processing specifications require classifying a packet as belonging to a flow based on a static set of protocol header fields. For example, classification may only occur using a limited set of extracted header fields in the form of tuples (e.g., 15 tuples are extracted and used for classification). However, as new protocols are developed, this model cannot be easily updated. Additionally, in some environments, applications may benefit from only partial classification of packets using only a small set of tuples. For example, with MPLS packets, packet-forwarding decisions may be made solely on the contents of short path labels within MPLS headers, without the need to further examine the packet itself. In OpenFlow, it is impossible to classify these packets using fewer than 15 tuples, which is inefficient in terms of parsing effort and flow table memory requirements.

Finally, current SDN models are also weak in processing multiple levels of tunneling (i.e. encapsulation and decapsulation). For example, consider the case of encapsulating an Ethernet packet on top of an Open Systems Interconnection (OSI) model data link layer header (i.e. OSI layer two, or L2) or network layer header (i.e. OSI layer three, or L3), which is often done when implementing Layer 2 Virtual Private Networks (L2VPN) or Pseudo-wires (PW). In this case, it is not possible to use the information found in the headers beyond the first level of L2 or L3 to perform finer grained packet processing.

SUMMARY

According to one embodiment of the invention, a method performed by a network device acting as a forwarding element within a software-defined network includes a step of receiving, over a network connection with a controller device within the software-defined network, a representation of configurable flow table definitions including key compositions based on a first plurality of relevant header fields of protocol headers, wherein the key composition for each of the flow table definitions identifies a set of one or more of the relevant header fields selected for that flow table definition, and configurable logic for selecting, based on a second plurality of relevant header fields of protocol headers, between flow tables defined by the configurable flow table definitions. The method further includes the step of creating a flow table based on each of the configurable flow table definitions. Each of the flow tables includes a configurable key column for each of the relevant header fields identified by the key composition included in the flow table definition on which that flow table is based. Each of the flow tables also includes a set of one or more action columns to store forwarding decisions. The method further includes the steps of installing the configurable logic for selecting between flow tables, receiving data to populate the configurable key columns and action columns of the flow tables, and populating the flow tables according to the received data. The method further includes the step of selecting from the forwarding decisions for packets received over network interfaces of the network device using one or more protocols. This selection occurs according to the configurable logic for selecting between flow tables, the flow tables, and each packet's values in the relevant header fields required by the configurable logic to select one of the flow tables for that packet and to select an entry from the selected flow table for that packet.

According to another embodiment of the invention, a network device to act as a flow switching enabled forwarding element includes a configuration module. The configuration module is operable to receive a representation of configurable flow table definitions including key compositions based on a first plurality of relevant header fields of protocol headers, wherein the key composition for each of the flow table definitions identifies a set of one or more of the relevant header fields selected for that flow table definition, and configurable logic for selecting, based on a second plurality of relevant header fields of protocol headers, between a plurality of flow tables defined by the configurable flow table definitions. The configuration module is also operable to install the configurable logic for selecting between the plurality of flow tables. The network device also includes a flow table management module, which is operable to create a flow table based on each of the configurable flow table definitions. Each of the flow tables is to include a configurable key column for each of the relevant header fields identified by the key composition included in the flow table definition on which that flow table is based. Each of the flow tables is to also include a set of one or more action columns to store forwarding decisions. The flow table management module is also operable to receive data to populate the configurable key columns and actions columns of the flow tables, and populate the flow tables according to the received data. The network device also includes a packet processing module. The packet processing module is operable to select from the forwarding decisions for packets received over network interfaces of the network device. This selection occurs according to the configurable logic for selecting between the plurality of flow tables, the flow tables, and each packet's values in those of the relevant header fields required by the configurable logic to select one of the flow tables for that packet and to select an entry from the selected flow table for that packet.

BRIEF DESCRIPTION OF THE DRAWINGS

The invention may best be understood by referring to the following description and accompanying drawings that are used to illustrate embodiments of the invention. In the drawings:

FIG. 9 illustrates an exemplary representation of a processing configuration used in a flexible and extensible flow processing system according to one embodiment of the invention.

DESCRIPTION OF EMBODIMENTS

Figure 1:
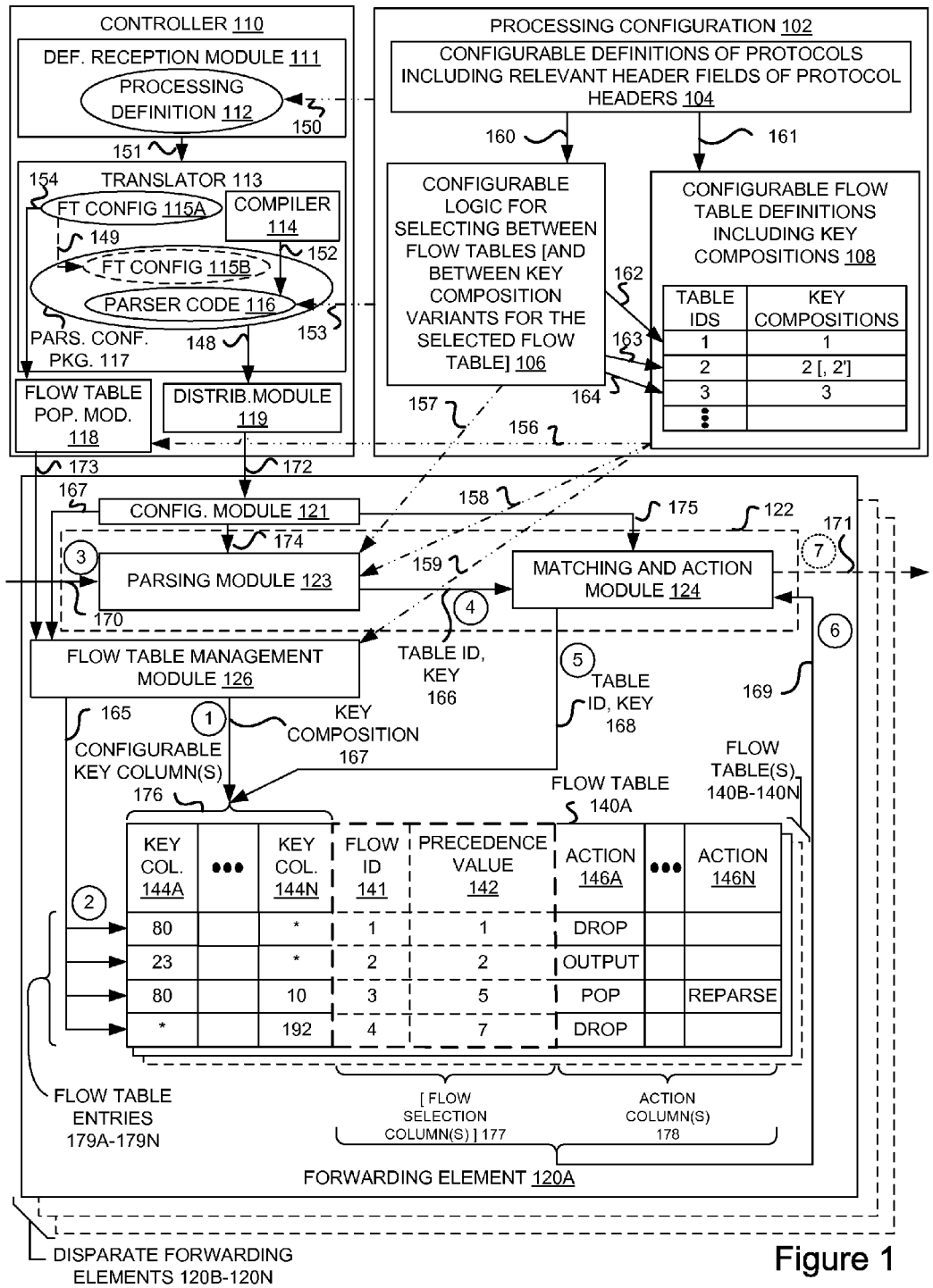
FIG. 1 illustrates an exemplary flexible and extensible flow processing system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

To ease understanding, dashed lines and/or bracketed text have been used in the figures to signify the optional nature of certain items (e.g., features not supported by a given implementation of the invention; features supported by a given implementation, but used in some situations and not in others).

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Traditionally, a network element can be a multifunctional network element that integrates both a control plane and a data plane (sometimes referred to as a forwarding plane or a media plane) into the same network element. In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics. Alternatively, a network element may only implement a data plane (forwarding plane) or only implement all or part of a control plane. This separation of duty is common in split-architecture network models. The term "split-architecture network" is largely synonymous for the term "software-defined network" (SDN), and the terms may be used interchangeably herein.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

A multifunctional network element can include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

Unlike monolithic network architectures that require complex network management functions to be distributed in the control planes of multifunctional network elements throughout the network, and further require complex data and control planes integrated into the same multifunctional network element, a flow-based software-defined network allows the data planes of the network to be separated from the control planes. Data planes can be implemented as simple discrete flow switches (forwarding elements) distributed throughout the network, and the control planes providing the network's intelligence are implemented in a centralized flow controller that oversees the flow switches. By decoupling the control function from the data forwarding function, software-defined networking eases the task of modifying the network control logic and provides a programmatic interface upon which developers can build a wide variety of new routing and protocol management applications. This allows the data and control planes to evolve and scale independently, while reducing the management necessary for the data plane network components.

In one embodiment of a software-defined network, the control plane controls the forwarding planes through a control plane signaling protocol over a secure and reliable transport connection between the forwarding elements and the controller. The controller typically includes an operating system that provides basic processing, I/O, and networking capabilities. A middleware layer provides the context of the software-defined network controller to the operating system and communicates with various forwarding plane elements using a control plane signaling protocol. An application layer over the middleware layer provides the intelligence required for various network operations such as protocols, network situational awareness, and user-interfaces. At a more abstract level, the application layer works with a logical view of the network and the middleware layer provides the conversion from the logical view to the physical view.

In an embodiment of a software-defined network paradigm, each forwarding element is a flow switching enabled network device. The flow switching enabled network device forwards packets based on the flow each packet belongs to instead of the destination IP address within the packet, which is typically used in current conventional packet switched IP networks. A flow may be defined as a set of packets whose headers match a given pattern of bits. In this sense, traditional IP forwarding is also flow-based forwarding where the flow is defined by the destination IP address only. Instead of just considering the destination IP address or the source IP address, though, generic flow definitions allow many fields (e.g., 10 or more) in the packet headers to be considered.

The control plane transmits relevant messages to a forwarding element based on application layer calculations and middleware layer mapping for each flow. The forwarding element processes these messages and programs the appropriate flow information and the corresponding actions in its flow tables. The forwarding element maps packets to flows and forwards packets based on these flow tables. Of course, flow tables may be implemented in a variety of data structures, such as maps, lists, arrays, files, tables, relational databases, etc. Further, the discussion of columns and rows within these tables is arbitrary; while one implementation may choose to put entries in rows it is trivial to modify the data structure to put entries in columns instead. In addition, the forwarding element may need to have data processing and data generation capabilities for such importation operations as DPI, NetFlow data collection, OAM, etc.

Standards for flow processing define the protocols used to transport messages between the control and the forwarding plane and describe the model for the processing of packets. This model for processing packets in flow processing devices includes header parsing, packet classification, and making forwarding decisions.

Header parsing describes how to interpret the packet based upon a well-known set of protocols (e.g., Ethernet, virtual local area network (VLAN), multiprotocol label switching (MPLS), IPv4, etc.). Some layers of headers contain fields including information about how to de-multiplex the next header. For example, an Ethernet header includes a field describing what type of header is in the next layer. Some protocol fields are used to build a match structure (or key) that will be used in packet classification. For example, a first key field could be a source media access control (MAC) address, and a second key field could be a destination MAC address.

Packet classification involves executing a lookup in memory to classify the packet by determining what is the best matching flow in the forwarding table that correspond to this packet based on the match structure, or key. It is possible that many flows can correspond to a packet; in this case the system is typically configured to determine one flow from the many flows according to a defined scheme. Additionally, a flow entry in the table can define how to match the packet to the entry. Several match criteria exist, such as "Exact" (value in the key has to match the value in the table exactly), "Wildcard" (value in the key can be anything), "Longest prefix match" (commonly used for matching IP addresses to route entries), "Bit mask" (only some of the bits in the key are used for the match), and "Range" (value in the key need to be within a defined bounded range of values).

Making forwarding decisions and performing actions occurs based on the flow entry identified in the previous step of packet classification by executing actions using the packet. Each flow in the table is associated with a set of actions to be executed for each corresponding packet. For example, an action may be to push a header onto the packet, forward the packet using a particular port, or simply drop the packet. Thus, a flow entry for IPv4 packets with a particular transmission control protocol (TCP) destination port could contain an action specifying that these packets should be dropped.

The description of how to implement the parsing, classification, and execution of actions is typically documented in a specification document. Nodes that implement this specification document can inter-operate with each other.

One aspect of an embodiment of the invention describes novel abstractions for describing parsing, matching, and actions. These abstractions will be exposed in a high level language that will be used to represent the forwarding element packet processing. Unlike typical software-defined networks, these abstractions will be used to program the forwarding element at runtime and not only at configuration time.

Another aspect of an embodiment of the invention ties the typical packet parsing and packet classification phases together, allowing forwarding elements to be protocol agnostic by having the flexibility to parse any type of packets provided by representations of the abstractions to generate matching keys for the classification of the flow. This tying of the parsing and classification provides a simpler way of expressing such relations.

An additional aspect of an embodiment of the invention includes a new processing model providing the implementation for forwarding elements based on a definition of processing using the defined abstractions. A processing definition specified in a high level language may get transformed into intermediate code representations to be used in both the parsing and actions phases of packet processing. Having simple, intermediate code representations allows disparate forwarding elements to use the same processing model code and thereby further reduces the complexity required within controllers for managing forwarding elements with varying configurations and capabilities.

Aspects of embodiments of the invention present a flexible way of modifying the behavior of a forwarding element that is not rigidly fixed into a formal specification or within low-level hardware implementation details. Thus, it is easy to quickly adapt the model to support new protocols or provide customized packet processing schemes.

Overview

FIG. 1 illustrates an exemplary flexible and extensible flow processing system according to one embodiment of the invention. In this diagram, representations of some or all portions of the processing configuration 102 are utilized by a controller 110 and a forwarding element 120A. While this illustration obscures the inner workings of one or more disparate forwarding elements 120B-120N, the depicted forwarding element 120A is largely representative of their characteristics unless otherwise noted.

For the purposes of this disclosure the terms "forwarding element" 120A and "disparate forwarding elements" 120B-120N may be used in certain circumstances. Unless otherwise noted or made clear by surrounding language, any details described regarding a forwarding element 120A are equally applicable to disparate forwarding elements 120B-120N, and details regarding disparate forwarding elements 120B-120N are similarly applicable to a forwarding element 120A.

The processing configuration 102 includes three primary abstractions used to specify the forwarding processing model to be implemented by the forwarding element 120A. One abstraction is configurable definitions of protocols including relevant header fields of protocol headers 104. These configurable definitions 104 specify the types of protocol headers that will be parsed by the forwarding element 120A and the other disparate forwarding elements 120B-120N within the network. Thus, the configurable definitions 104 include a set of one or more packet protocol header definitions, where each protocol header definition includes a header name and is defined according to one or more header fields within the header according to the protocol specification. These header fields indicate the locations and data types of each defined field within the header. In an embodiment of the invention, a data type is simply a generic field, and the length of this field is appended to the protocol header definition. Additionally, in an embodiment of the invention, the configurable definitions 104 for a header may not define every possible header field within a header. In such embodiments, the header definition includes a header length, which is a mathematical expression used to calculate the total length of the header based on values within one or more header fields of the header. For example, a header length in bytes may be defined for an IPv4 header as being equal to the value from a "hlen" field within the header multiplied by the number four. In this example, supposing the value within the "hlen" field is 5, the header length would be calculated to be 5*4 bytes, or 20 bytes.

A second abstraction in the processing configuration 102 is configurable flow table definitions including key compositions 108, which utilize 161 aspects of the configurable definitions of protocols including relevant header fields of protocol headers 104. The configurable flow table definitions 108 are used to define the number of flow tables 140A-140N to be used in packet classification as well as the type, size, and number of configurable key columns 176 in each table to be used for matching. Additionally, representations of the configurable flow table definitions 108 are also used to create key generation logic 158 used within the forwarding element 120A, which specifies how to generate a key using a packet's parsed protocol header fields. This key generation logic 158 may be created at various places within such a system, such as by the compiler 114 on the controller 110 or even on an individual forwarding element (e.g. 120A) based upon the parser configuration package 117.

The configurable flow table definitions including key compositions 108 include table definition instructions for each flow table 140A-140N to be used in the forwarding element 120A. Each table definition includes a unique table identifier (ID) to correspond to a particular flow table (e.g. 140A), and a set of one or more field statements. Each field statement includes a field ID to identify a relative position of a key field within the key (and/or the relative position of one of the configurable key columns 176 within the flow table 140A), a match type to indicate how to compare a key field against the configurable key column to determine if they match, and one or more key fields to indicate which of the parsed protocol header fields are to be used as a key field as well as indicating the type and size of a corresponding one of the configurable key columns 176 within the table. The match type specifies one or more matching algorithms to be used when comparing a key field against a configurable key column. For example, the matching algorithms may be an exact match, a longest prefix match, a mask, or a range. The one or more key fields for a field statement indicate which parsed header field will be used to generate the corresponding key field portion of the key.

If exactly one key field is defined for a field statement, that key field is used when generating the portion of the key corresponding to the field statement. However, in an embodiment of the invention, more than one key field may be declared for a field statement. This configuration allows for the use of key composition variants. Key composition variants designate different ways to construct a key based upon the headers that exist within a particular packet. Thus, when parsing two different packets, different header fields from each packet may be used to generate a key for matching within the flow table indicated by the table definition instruction's table ID.

For example, consider a scenario with a table definition including a field statement with a field ID of '6' and two key field possibilities depending upon the transport layer (L4) header in a packet. If the parsed packet contained a TCP header, a TCP header field is to be used in generating the sixth field within the key. However, if the packet instead contained a user datagram protocol (UDP) header, a UDP header field will be used in generating the sixth field within the key. In this scenario, one key composition variant includes a TCP header field, and one key composition variant includes a UDP header field. Regardless of which key composition variant is used to construct the key, the same flow table and configurable key columns will be used for matching.

A logical depiction of the configurable flow table definitions including key compositions 108 is represented as a table in FIG. 1. For each table definition—represented by a table ID—there may be one key composition (e.g., table ID of 1, key composition of 1) or in some embodiments of the invention, more than one key composition, or multiple key composition variants (e.g., table ID of 2, key compositions of 2 and 2').

A third abstraction in the processing configuration 102 is configurable logic for selecting between flow tables 106, which utilizes 160 aspects of the configurable definitions of protocols including relevant header fields of protocol headers 104. In an embodiment of the invention, this configurable logic 106 also selects between key composition variants for the selected flow table. The configurable logic for selecting between flow tables 106 defines the relationships and ordering between protocol headers to be parsed. These relationships may be logically represented as a type of parse tree, which, if materialized would illustrate possible packets (i.e. protocol header orderings) to be parsed and classified according to the defined processing configuration 102. In addition to defining the relationships between protocol headers, the configurable logic for selecting between flow tables 106 also defines which flow table 140A-140N is to be utilized for packet classification based upon the order of protocol headers in the packet. Thus, different parse paths may lead to different tables being selected for classification. For example, one parse path 162 may lead to a different table ID being selected than other parse paths 163 or 164. In an embodiment, these parse paths also determine which key composition variant should be used when constructing the key for the selected flow table.

The configurable logic for selecting between flow tables 106 defines the protocol header ordering relationships and determines tables for classification using stack instructions. Each stack instruction corresponds to a packet protocol header and includes a header name, a key field, and a set of one or more rules, each rule including a key value and a next header name. The key field is one of the header fields within the packet header under inspection that is to be compared against the key values of the rules in an attempt to determine the next header to be parsed. When the key field matches a key value of a rule, parsing is to continue with the succeeding packet header using the stack instruction having a header name corresponding to the next header name indicated by the matched rule. When the key field fails to match a key value of a rule, a flow table is selected for packet classification according to a table ID indicated by the stack instruction. If no table ID is indicated by the stack instruction, the configurable logic for selecting between flow tables 106 may indicate that corrective action is to be taken (e.g., dropping the packet, transmitting the packet to a controller, etc.).

A representation 150 of the processing configuration 102 is created in the form of a processing definition 112. The controller 110 may receive the processing definition 112 from a remote user or device, or it may create the processing definition 112. In the embodiment illustrated in FIG. 1, the controller 110 includes a definition reception module 111 to receive the processing definition 112. The processing definition 112 is provided 151 to a translator 113 to produce flow table configuration information 115A that is provided to 154 and used by the flow table population module 118 to populate flow tables 140A-140N with flow table entries. Additionally, the translator 113 provides the processing definition 112 to a compiler 114, which may produce 152 parser code 116. This parser code 116, and optionally a version of the flow table configuration information 115B, make up a parser configuration package 117.

The purpose of the translator 113 is, in part, to translate the processing definition 112 into a parser configuration package 117 able to be utilized by disparate forwarding elements 120A-120N for processing packets. The translator 113, through the use of its compiler 114, thus acts as a parser generator (i.e., compiler-compiler, or compiler generator) by generating code for a packet parser in the form of parser code 116 from the formal abstractions (i.e. a type of grammar) provided by the processing definition 112. The parser code 116 may also be utilized by a forwarding element (e.g. 120A) to perform actions upon packets. Thus, the parser code 116, which is part of the parser configuration package 117, incorporates representations 153 of the configurable definitions of protocols 104, configurable logic for selecting between flow tables 106, and configurable flow table definitions 108 from the processing configuration 102. In an embodiment, the parser code 116 is intermediate-level code specified using a small set of instructions (e.g., load, store, add, branch, compare, etc.) and a defined set of virtual registers to be used as temporary data storage while executing actions with the packets.

The portion of the parser code 116 used in the parsing phase of packet processing may be logically represented as a directed graph. Each node in such a directed graph represents a protocol header and the directed edges represent paths taken based upon the value within a field of the header. An example of such a directed graph is presented in FIG. 7, which illustrates a representation of a parsing phase 700 and key generation phase 701 according to one embodiment of the invention where the parsing phase 700 is operable to parse UDP, TCP, and MPLS packets. When a first protocol header of Ethernet 702 is parsed to identify its fields, a branching decision occurs based upon the value of the ether_type field of the Ethernet header 702. If the ether_type field value is 0x8847, the next header to be parsed is an MPLS header 704. In an embodiment, a branching decision occurs based upon the value of a bos (bottom of stack) field within the MPLS header 704. While the bos field value is zero, parsing will continue with the next header, which is also an MPLS header 704. When the bos field value is not zero, the parsing phase 700 ends and key generation 701 begins. In another embodiment, the branching decision upon reaching the MPLS header 704 depends upon both the bos field value and a key_is_matchable field value, which signals an occurrence where more MPLS packets 704 may exist within the packet, but further inspection is unnecessary as the desired key for packet classification may already be generated. Thus, when either the key_is_matchable field value or the bos field value is not zero, the parsing phase 700 ends and key generation 701 begins. Similarly, if the ether_type field value of the Ethernet header 702 was 0x8100 (instead of 0x8847), the next header of the packet would be parsed as an IPv4 header 708. At this point, the protocol field value of the IPv4 header 708 is examined: if it is 0x11, parsing will continue with the next header as a UDP header 710, and if it is 0x06, parsing will continue with the next header as a TCP header 712. The UDP 710 or TCP 712 header will then be parsed to have its fields identified, and the parsing phase 700 ends and key generation 701 begins.

Turning back to FIG. 1, the parser code 116 within the parser configuration package 117 also contains instructions used to perform actions upon packets during the action execution stage of packet processing within the disparate forwarding elements 120B-120N. These actions are populated by the controller 110 when flows are inserted or modified in the forwarding element 120A. Two categories of actions can be defined—actions that are independent upon the protocols of the packet, and actions that are dependent upon the protocols of the packet. Examples of actions that are protocol independent include outputting the packet to a port, setting a queue for the packet, or dropping the packet. Additionally, an independent action may include sending the packet back to the parser, which typically occurs after it has been modified by an action.

Further, by utilizing the configurable definitions of protocols including relevant header fields of protocol headers 104 within the processing configuration 102 and represented within the processing definition 112, protocol dependent actions may be performed upon packets. This provides increased flexibility through a protocol-specific customization of packet processing techniques, wherein packets having certain protocol headers may be modified in fine-grained ways. For example, protocol dependent actions may be defined to push additional headers onto the packet or pop headers from the packet. Further, protocol dependent actions may change fields within certain packet headers in simple or complex ways. For example, a field may be modified mathematically by incrementing or decrementing a time to live (TTL) field (a field commonly found in IPv4 headers), or a destination address value may be replaced with a completely different value based upon the original value in the field. Additionally, after such a modification, the actions may calculate a new checksum for the header or packet.

This configuration allows for further control of packet processing by supporting fine-grained actions performed when there are parsing loops or recursions within the packet, such as when there are multiple headers of the same type (e.g., MPLS, etc.) in the packet, or encapsulated or tunneled traffic (e.g., Ethernet-MPLS-MPLS-Ethernet, etc.). In such situations, the actions may be sufficiently intelligent to modify, pop, or push targeted headers within the packet. An independent action may then be triggered to re-send the packet back for further parsing. Of course, these customized actions to be performed on particular protocol stacks are possible because of the nature of the parser code 116, as the forwarding element 120A itself does not have knowledge about how the headers are supposed to be laid out in the packet, but merely follows the procedures defined by the parser code 116. For example, the forwarding element 120A need not be fundamentally designed to know that L3 headers (e.g., Internet protocol (IP), IPSec, Internetwork Packet Exchange (IPX), etc.) are supposed to appear after L2 headers (e.g., address resolution protocol (ARP), asynchronous transfer mode (ATM), point-to-point protocol (PPP), etc.), but instead needs to only blindly rely upon the parser code 116 to move through the headers of the packet.

In addition to creating parser code 116, the translator 113 also generates flow table configuration 115A information that includes a representation of the configurable flow table definitions including key compositions 108. A version 115B of the flow table configuration 115A may be included within the parser configuration package 117 that is distributed 172 to the forwarding elements 120A-120N. Upon receipt of the parser configuration package 117 by a forwarding element (e.g. 120A), the configuration module 121 may then utilize the flow table configuration 115B to transmit information 167 to the flow table management module 126 directing it to create or modify the flow tables 140A-140N. For example, the configuration module 121 uses the flow table configuration 115A in order to instruct 167 the flow table management module 126 as to how many flow tables 140A-140N are necessary, the key composition of each table (how key columns 144A-144N for each table are to be structured), and how entries 179A-179N in the flow tables 140A-140N are to be structured. Additionally, the flow table configuration 115A created by the translator 113 is provided 154 to the flow table population module 118, which uses its representation of the configurable flow table definitions including key compositions 108 in order to correctly populate flow table entries 179A-179N in the flow tables 140A-140N of the disparate forwarding elements 120A-120N by sending data 173 to the flow table management module 126.

Thus, the controller 110 (via the flow table population module 118) interacts 173 with the forwarding element 120A to maintain the entries 179A-179N of the necessary flow tables 140A-140N. The controller 110 also interacts 167 with the forwarding element 120A via the configuration module 121 to create or modify the flow tables 140A-140N. Thus, all such configuration and management of the flow tables 140A-140N occurs through the flow table management module 126.

Each flow table includes configurable key columns 176 and action columns 178. The configurable key columns 176 implement a key composition and include one or more key columns 144A-144N, thus allowing for packet classification by matching parts of a key to the key columns 144A-144N. As depicted in FIG. 1, these configurable key columns 176 may include literal values (e.g., 80, 23, 10, 192, etc.) or wildcard values (e.g., '*'). The action columns 178 include one or more actions 146A-146N for each flow entry to be performed upon a packet being classified as belonging to that corresponding flow. As depicted in FIG. 1, these action columns 178 may include a wide variety of actions, some of which are hereby illustrated generically as DROP, OUTPUT, POP, and REPARSE. In an embodiment of the invention, these columns contain action IDs to identify action code located elsewhere, and may include argument values to be used when performing an action.

In an embodiment, the flow table also includes one or more flow selection columns 177. One possible column is a Flow ID column 141, which assigns a unique identifier to each flow entry for ease of communication between modules within the forwarding element 120A and between the forwarding element 120A and the controller 110. For example, when a controller 110 desires to modify one or more actions 146A-146N in a flow table 140A, it may easily transmit a Flow ID 141 value to quickly identify which entry is to be modified. Another possible column is a precedence value column 142, which includes values to allow for flow prioritization when a packet's key matches more than one entry of the flow table 140A. This typically occurs when wildcard values are within the configurable key columns 176. For example, given the depicted scenario in FIG. 1, a packet key having a value of '80' corresponding to key column 144A and a value of '192' corresponding to key column 144N may possibly match two flow entries in the flow table 140A—the first depicted entry 179A and the last depicted entry 179D. Assuming both entries match the key, and assuming no other configurable key columns (e.g., 144B) for the first entry 179A and the last entry 179D are different, the precedence value 142 for each entry is then used to determine which flow to classify the packet to. As the first flow entry 179A has a precedence value 142 of '1' and the last entry 179D has a precedence value 142 of '7', one embodiment of the invention may deem the record with the smallest precedence value to be determinative, and thus the packet would be classified as belonging to the first flow entry 179A. Alternatively, in another embodiment which deems the record with the largest precedence value to be the determinative, the packet would be classified as belonging to the last flow entry 179D. This configuration requires that the controller 110 maintain the flow tables 140A-140N in such a manner as to prevent a precedence tie from occurring. This may be done in a variety of ways, such as assigning every entry 179A-179N a different precedence value 142, or only assigning the same precedence value 142 to entries that are mutually exclusive, meaning it is impossible for two entries with a shared precedence value 142 to possibly match one key. In other embodiments, in the event of a precedence value 142 tie, an additional tiebreaking procedure occurs, such as selecting the entry higher in the table or the entry with a longest prefix match or a most precise match (i.e. the entry having the fewest wildcards within the configurable key columns 176).

Table 1 presents an example of a flow table according to one embodiment of the invention. The table includes two key columns, one for a first MPLS label and one for a second MPLS label. The table also includes flow selection columns: a Flow ID column 141 to store unique identifiers for every entry in the table, and a precedence column to store precedence values used for entity selection. The table further includes one action column, which stores actions to be executed upon packets with keys that match the two key columns and thereby are classified as belonging to a particular flow.

TABLE 1

| CONFIGURABLE KEY COLUMNS 176 | | FLOW SELECTION COLUMNS 177 | | ACTION |
| --- | --- | --- | --- | --- |
| MPLS LABEL 0 144A | MPLS LABEL 1 144B | FLOW ID 141 | PRECEDENCE VALUE 142 | COLUMN 178 ACTION 146A |
| * | 2 | 1 | 5 | Output |
| 4 | 6 | 2 | 1 | Queue |
| 2 | 2 | 3 | 1 | Drop |
| 9 | * | 4 | 1 | Output |

Assuming the parsing of a packet selects a flow table as illustrated in Table 1 and generates a key containing a '2' as a first MPLS label (i.e. MPLS LABEL 0) and a '2' as a second MPLS label (i.e. MPLS LABEL 1), the key will match the entries of the flow table identified by Flow ID '1' as well as Flow ID '3'. In an embodiment where the matched entry with the lowest precedence value signifies flow membership, the packet will be classified to Flow ID '3' because its precedence value '1' is lower than the precedence value '5' of Flow ID '1', and therefore the executable action indicates the packet will be dropped. In an embodiment where the entry with the highest precedence value signifies flow membership, the packet is classified under Flow ID '1' and its executable action indicates the packet will be output. Alternatively, in an embodiment where the earliest flow table entry signifies flow membership, the packet will immediately be classified as belonging to Flow ID '1' because the packet's key matches the key columns. In an embodiment using this "earliest flow table entry" configuration, a precedence value is unnecessary because it is inherent in the algorithm: upon detecting a first entry with key columns matching the key, the first entry is automatically identified as the match.

Turning back to FIG. 1, after the parser configuration package 117 is produced by the translator 113, the parser configuration package 117 is sent 148 to a distribution module 119 within the controller 110 that further transmits 172 the parser configuration package 117 to forwarding elements 120A-120N in the software-defined network. Because the forwarding elements 120A-120N may differ in the resources available for storing and executing the computer code, specific capabilities describing the parser configuration package's 117 parser code 116 are communicated by the distribution module 119 to each forwarding element 120A-120N. For example, specific capabilities such as the size of the parser code 116 and the number of virtual registers required by the parser code 116 may be communicated, and each forwarding element 120A-120N may then implement these capabilities according to the resources available to it. Thus, the controller 110 can program any forwarding element that understands the parser configuration package 117 without knowledge of the forwarding element's internals or how to generate native code for a particular forwarding element.

A configuration module 121 within a forwarding element (e.g., 120A) receives the parser configuration package 117 sent by the distribution module 119. The configuration module 121 distributes representations of the parser code 116 from the parser configuration package 117 to segments of the packet processing module 122, which encompasses the main packet processing pipeline for the forwarding element 120A. For example, the parsing module 123 receives a representation 174 of the parser code 116, enabling it to parse packets to select a flow table and generate a key for packet classification, which are sent 166 on to the matching and action module 124 for additional packet processing. Additionally, to execute actions with the packet, the matching and action module 124 relies upon a representation 175 of the parser code 116 sent from the configuration module 121. Additionally, the configuration module 121 also uses information from the parser configuration package 117 (such as the flow table configuration 115B or the parser code 116) to instruct 167 the flow table management module 126 to create necessary flow tables 140A-140N.

Figure 2:
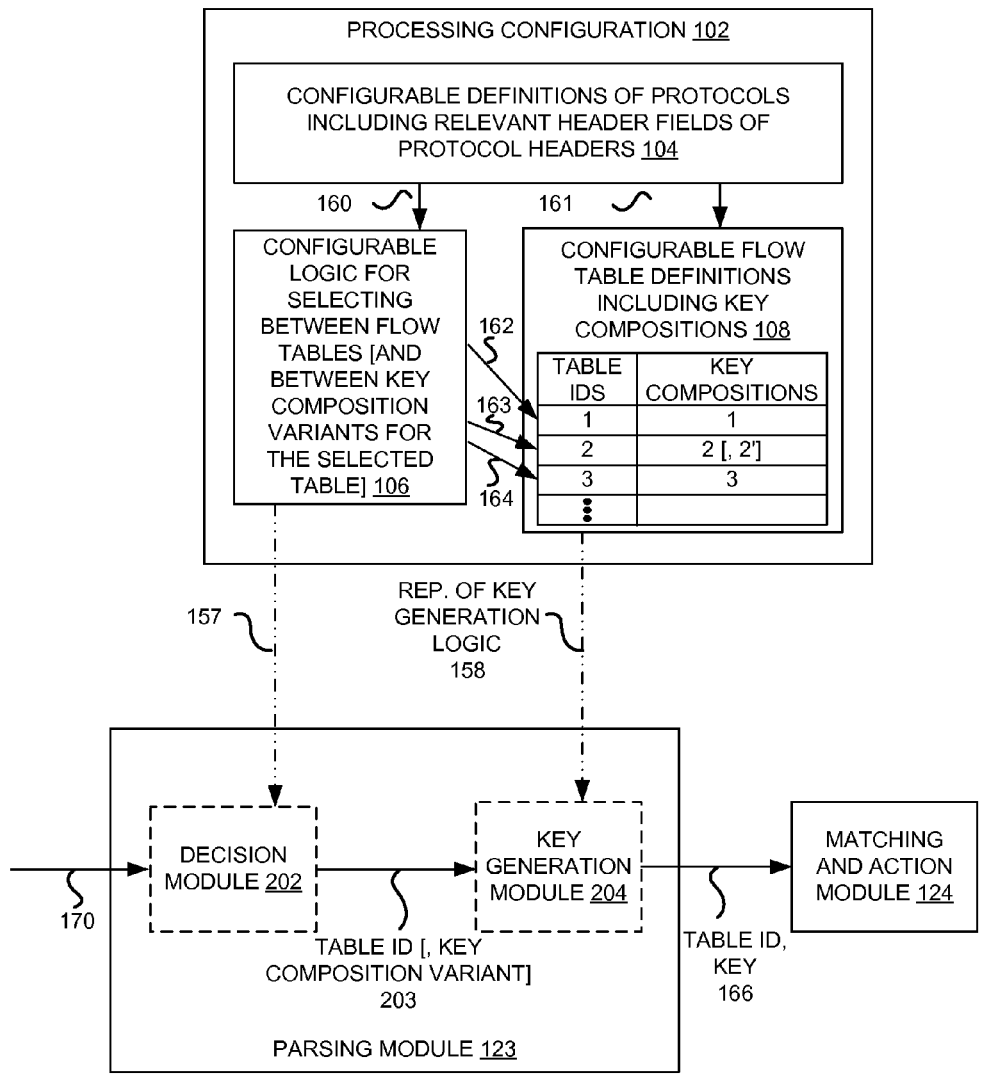
FIG. 2 illustrates representations of a processing configuration within a parsing module according to one embodiment of the invention.

FIG. 2 depicts how representations of a processing configuration 102 may be used in one embodiment of a parsing module 123 including a decision module 202 and a key generation module 204. Upon receipt of a packet 170, the decision module selects one of the flow tables (e.g., 140A) based on a representation 157 of the configurable logic for selecting between flow tables 106 and the values of the packet's protocol header fields identified by the configurable logic 106. The decision module 202 sends 203 the selected flow table 140A identifier to the key generation module 204. In an embodiment of the invention, the decision module 202 also selects a key composition variant for the selected flow table 140A to be used when generating a key, and sends 203 the key composition variant along with the table identifier to the key generation module 204.

The key generation module 204 generates a key using a representation of key generation logic 158 according to the configurable flow table definitions including key compositions 108. This key generation is based upon the key composition of the selected flow table 140A and the values of the packet's protocol header fields identified by the key composition. The key generation module 204 sends 166 this key along with the selected flow table 140A identifier to the matching and action module 124 to continue the packet processing.

Figure 7:
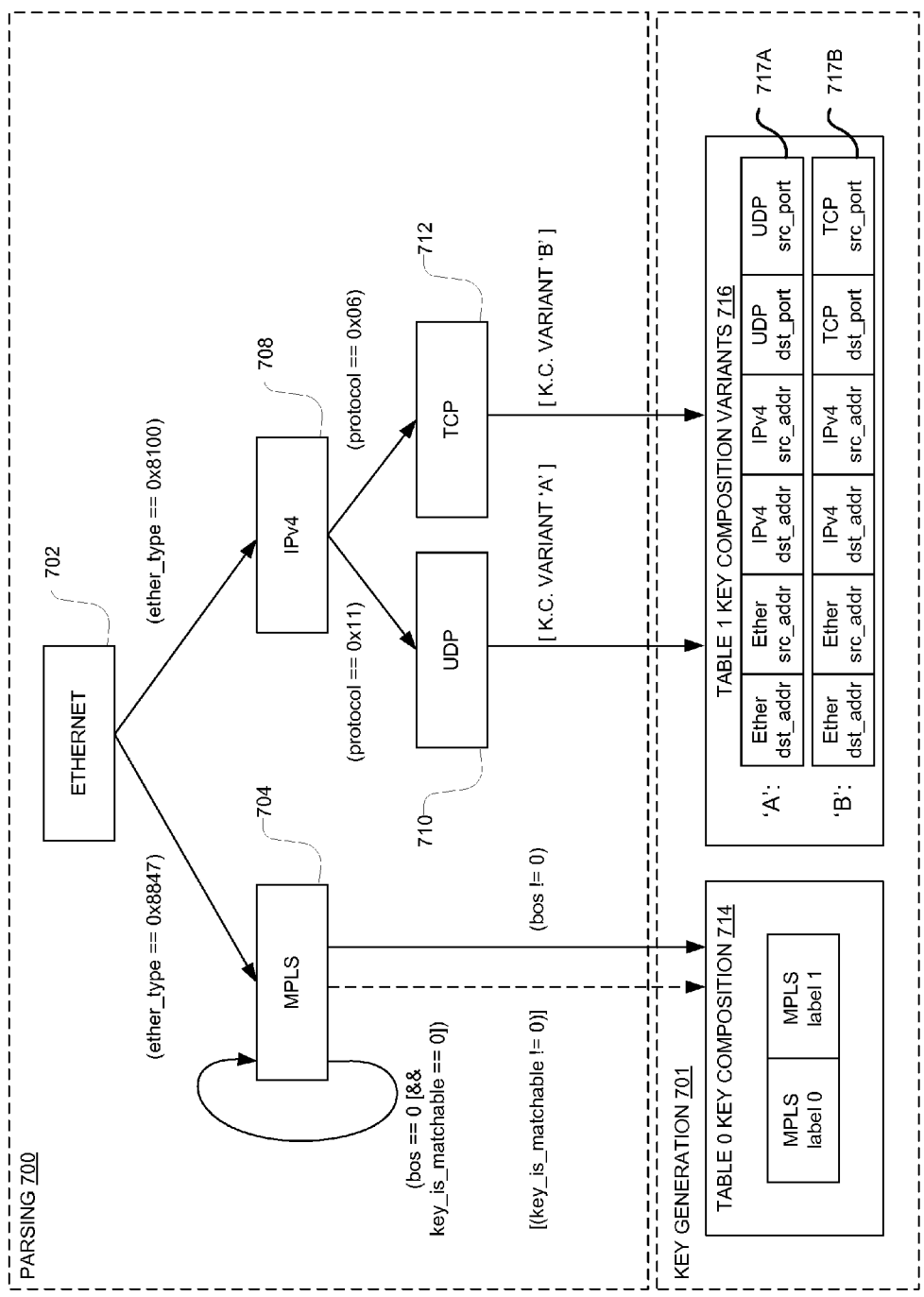
FIG. 7 illustrates a representation of a parsing procedure and key generation according to one embodiment of the invention.

Operational aspects of the parsing module 123 are further depicted in FIG. 7. As described above, the packet is parsed 700 using parser code 116 from the parser configuration package 117 to identify the packet's protocol header fields and select a flow table for classification. In the embodiment depicted in FIG. 2, the decision module 202 performs this identification and selection that comprises the parsing phase 700 of packet processing. Next, in a key generation stage 701, a key is constructed according to the key composition of the selected table. For example, when the parse path identifies the packet as containing at least one MPLS header 704, table '0' will be selected and its key composition 714 is used to generate a key based upon the MPLS labels identified while parsing the packet. In another example where the packet was identified as including an IPv4 header, table '1' will be selected and one of its key composition variants 716 will be used to generate a key using fields from the Ethernet, IPv4, and either the UDP or TCP headers of the packet. In an embodiment of the invention, a different key composition variant will be used according to the headers identified above in the parsing 700 phase. If the packet contains a UDP header 710, a first key composition variant 717A is used that includes the UDP dst_port and src_port fields. Alternatively, if the packet contains a TCP header 712, a second key composition variant 717B is used that includes the TCP dst_port and src_port fields. In the embodiment depicted in FIG. 2, the key generation module 204 performs this key generation 701 phase.

Turning back to FIG. 1, while utilizing the representation 157 of configurable logic for selecting between flow tables 106 to parse the packet, the parsing module 123 in an embodiment identifies each defined field of each identified header for the packets it examines. The values of these fields (or pointers to the locations of these fields or packets) are persisted in a packet context storage area within the forwarding element 120A, which allows each module in the packet pipeline to quickly access this information during processing of a packet. This is especially useful later in the packet processing pipeline when the matching and action module may need to perform an action (e.g., pop a header, edit a field within a header, etc.) using the packet which requires knowledge of the packet's header layout.

The matching and action module 124 receives and uses the selected flow table identifier and key to identify one entry of the selected flow table 140A based at least on comparing 168 the key with the populated keys in the configurable key columns 176 of the selected flow table 140A. Upon identifying a matching entry of the flow table 140A, the values from the action columns 178 are returned to the matching and action module 124. In one embodiment, one or more of the flow selection columns 177 are also returned to the matching and action module 124 for various purposes, such as selecting one flow entry when multiple entries (e.g., 179A, 179D, and 179F) match the key. In an embodiment of the invention, when the key does not match any entry within the selected flow table 140A, the packet is transmitted back to the controller 110. In response, the controller 110 may decide to create a new flow table entry (e.g., 179N) in the selected flow table 140A using the flow table population module 118.

With the returned 169 one or more actions 146A-146N specified by the identified entry, the matching and action module 124 executes the actions upon the packet. As described above, numerous types of protocol independent and dependent actions may be performed that can result in the packet being forwarded, dropped, modified, or reparsed. Additionally, the key (or portions thereof) may be sent to another flow table (e.g., 140B) to attempt to match a flow entry there.

One way to utilize the system is presented in FIG. 1, which uses circled numbers to indicate an order for reading the items illustrated to ease understanding of the invention. In circle one, flow tables 140A-140N are created by the flow table management module 126 according to each of the configurable flow table definitions 108 within the parser configuration package 117 by defining one or more configurable key columns 176 specified by the key composition for each flow table 167 according to data received 167 from the configuration module 121. With these tables defined, one or more flow table entries 179A-179N are populated 165 into one or more of the flow tables 140A-140N by the flow table management module 126 according to the received data 173 from the controller 110 as circle two. With these tasks complete, the forwarding element 120A receives a packet 170 as circle three, which then enters the parsing module 123. The parsing module 123 utilizes the parser code 116 from the parser configuration package 117, which includes representations of the configurable logic for selecting between flow tables 106 and the configurable flow table definitions including key compositions 108, to select one of the flow tables (e.g., 140A) based upon the packet's protocol header fields identified by the configurable logic 106 and to generate a key based upon the key composition of the selected flow table 140A from the configurable flow table definitions 108 and the values of the packet's protocol header fields identified by the configurable logic 106 as circle four. In circle five, the selected table ID and key are utilized 168 by the matching and action module 124 to identify one entry (e.g., 179A) of the selected flow table 140A based at least on comparing the key with the populated keys in the selected flow table 140A. In circle six, one or more actions specified by the identified entry 179A are returned 169 from the flow table 140A to the matching and action module 124 and are executed. If the action requires the packet to be forwarded, in dashed circle seven the packet and forwarding information (e.g., port, multicast or unicast, etc.) is sent 171 to an egress module to be forwarded.

Figure 3:
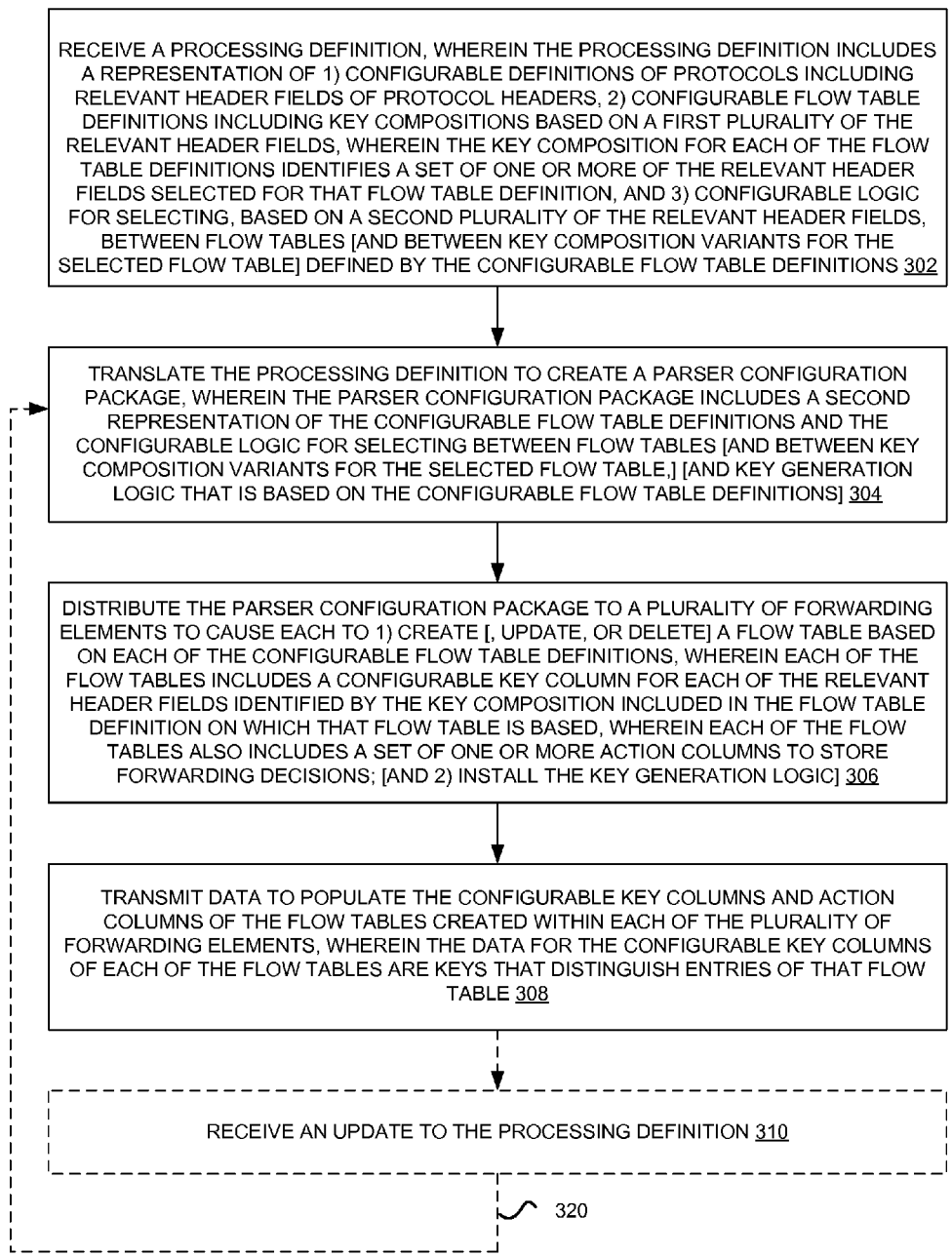
FIG. 3 illustrates a flow diagram of a method in a network element acting as a controller in a software-defined network according to one embodiment of the invention.

FIG. 3 illustrates a flow diagram of a method in a network element acting as a controller 110 in a software-defined network according to one embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

In the embodiment presented in FIG. 3, a controller 110 first receives 302 a processing definition 112, wherein the processing definition 112 includes a representation of configurable definitions of protocols including relevant header fields of protocol headers 104, configurable flow table definitions including key compositions based on a first plurality of the relevant header fields 108, wherein the key composition for each of the flow table definitions identifies a set of one or more of the relevant header fields selected for that flow table definition, and configurable logic for selecting, based on a second plurality of the relevant header fields, between flow tables defined by the configurable flow table definitions 106. In an embodiment, the configurable logic for selecting between flow tables 106 also selects between key composition variants for the selected flow table.

The controller 110 then translates 304 the processing definition 112 to create a parser configuration package 117, wherein the parser configuration package 117 includes a second representation of the configurable flow table definitions 108, and the configurable logic for selecting between flow tables 106. In an embodiment, the included representation of the configurable logic is for selecting between flow tables and also for selecting between key composition variants for the selected flow table. In one embodiment, the parser configuration package 117 also includes a representation of key generation logic 158 that is based on the configurable flow table definitions 108.

With the compiled parser code 116 and optionally the flow table configuration 115B, the controller 110 distributes 306 the parser configuration package 117 to a plurality of forwarding elements 120A-120N to cause each to: 1) create a flow table (e.g., 140A) based on each of the configurable flow table definitions 108, wherein each of the flow tables 140A-140N includes a configurable key column 176 for each of the relevant header fields identified by the key composition 167 included in the flow table definition on which that flow table is based, and wherein each of the flow tables 140A-140N also includes one or more action columns 178 to store forwarding decisions; and 2) install the key generation logic 158. In an embodiment of the invention, the distribution 306 of the parser configuration package 117 to the plurality of forwarding elements 120A-120N may further cause each to create, update, or delete flow tables, as opposed to merely creating flow tables as described above.

With flow tables 140A-140N configured and the key generation logic 158 installed, the controller 110 transmits 308 data to populate the configurable key columns 176 and action columns 178 of the flow tables 140A-140N created within each of the plurality of forwarding elements 120A-120N, wherein the data for the configurable key columns 176 of each of the flow tables 140A-140N are keys that distinguish entries 179A-179N of that flow table.

In an embodiment of the invention, the controller 110 may receive 320 an update to the processing definition 112. With such an update, the controller 110 translates the updated processing definition 304 to create an updated parser configuration package 117, which is then distributed 306 to the forwarding elements 120A-120N. Because flow tables 140A-140N already exist within the plurality of forwarding elements 120A-120N, the distribution 306 of the parser configuration package 117 may cause one or more of the forwarding elements 120A-120N to create, update, or delete flow tables 140A-140N as well as install key generation logic 158.

Figure 4:
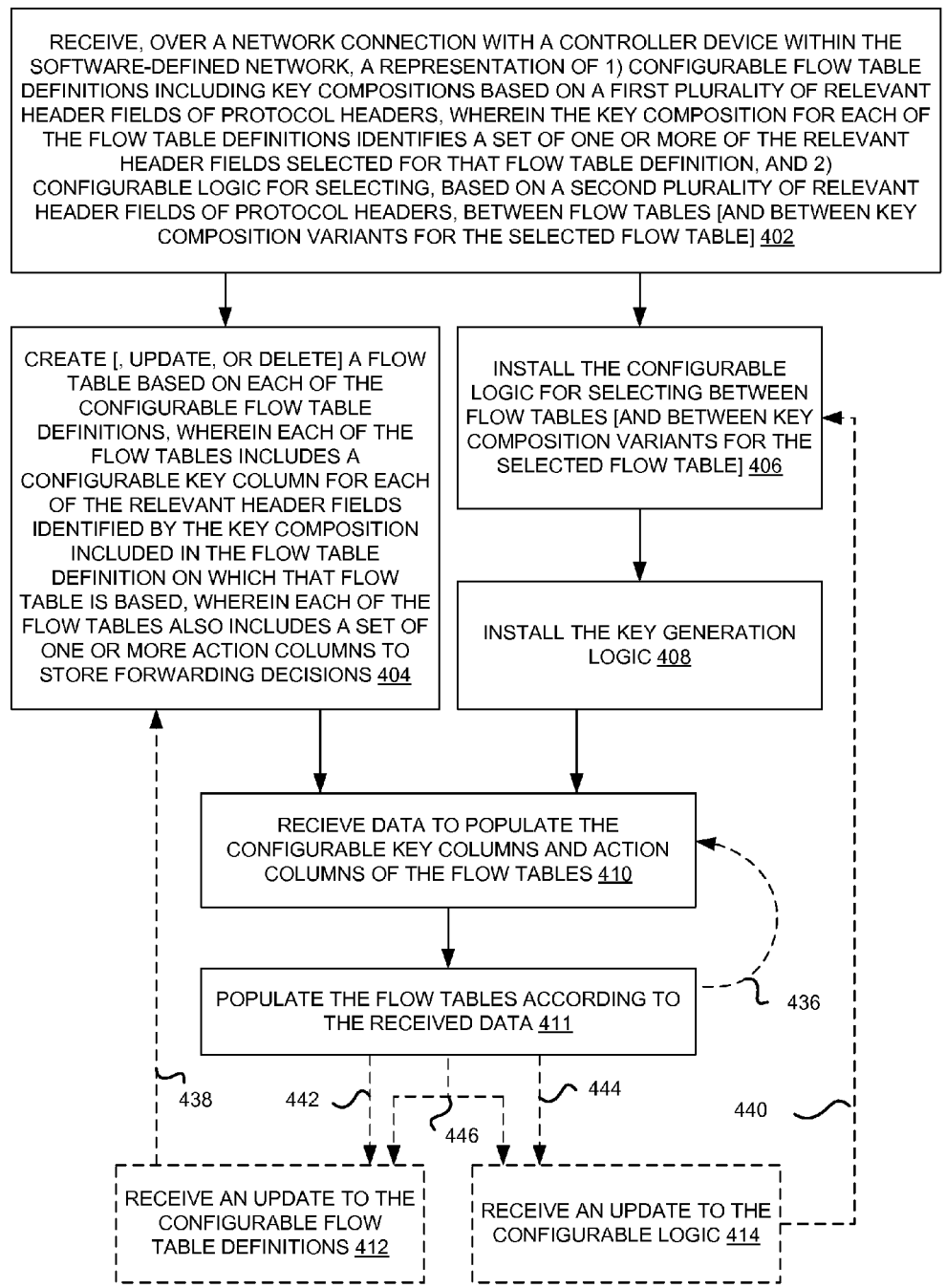
FIG. 4 illustrates a flow diagram of a method in a network element acting as a forwarding element in a software-defined network according to one embodiment of the invention.

FIG. 4 illustrates a flow diagram of a method in a network element acting as a forwarding element (e.g., 120A) in a software-defined network according to one embodiment of the invention. This figure, at least, illustrates steps used to dynamically configure and update a forwarding element 120A for use in packet processing.

The forwarding element 120A receives 402, over a network connection with a controller device within the software-defined network, a representation of configurable flow table definitions including key compositions 108 based on a first plurality of relevant header fields of protocol headers, wherein the key composition for each of the flow table definitions identifies a set of one or more of the relevant header fields selected for that flow table definition, and configurable logic for selecting, based on a second plurality of relevant header fields of protocol headers, between flow tables 106. In an embodiment, the configurable logic 106 also selects between key composition variants for the selected flow table.

With the representation, the forwarding element 120A will also create 404 a flow table 140A-140N based on each of the configurable flow table definitions 108, wherein each of the flow tables 140A-140N includes a configurable key column 176 for each of the relevant header fields identified by the key composition included in the flow table definition on which that flow table is based, wherein each of the flow tables also includes a set of one or more action columns to store forwarding decisions. The forwarding element 120A will also utilize the representation to install 406 the configurable logic for selecting between flow tables 106 and to install 408 key generation logic. In an embodiment, the installed configurable logic 106 also selects between key composition variants for the selected flow table.

The forwarding element 120A is thus able to receive 410 data to populate entries 179A-179N of the flow tables 140A-140N, wherein each entry includes a key within key columns 144A-JX44N and a set of one or more actions in 146A-146N. With this data, the forwarding element 120A populates 411 one or more entries 179A-179N of one or more flow tables 140A-140N according to the received data.

In an embodiment, the forwarding element 120A may again 436 receive 410 data to populate entries 179A-179N of the flow tables 140A-140N, wherein each entry includes a key within key columns 144A-JX44N and a set of one or more actions in 146A-146N. Thus, the forwarding element 120A will again populate 411 one or more entries 179A-179N of one or more flow tables 140A-140N according to the received data.

In an embodiment, the forwarding element 120A will receive an update from the controller 110. This update may be in the form of an update to the configurable flow table definitions 412 and/or an update to the configurable logic 414.

If the forwarding element 120A only receives 442 an update 412 to the configurable flow table definitions 108, the forwarding element 120A will then 438 create, update, or delete one or more flow tables 140A-140N according to the update 412.

If forwarding element 120A only receives 444 an update 414 to the configurable logic 406, the forwarding element 120A will install the updated configurable logic for selecting between flow tables 106 and to install 408 key generation logic. In an embodiment, the installed updated 414 configurable logic 106 also selects between key composition variants for the selected flow table.

However, if the update received from the controller 110 includes both 446 an update 412 to the configurable flow table definitions 108 and an update 414 to the configurable logic 106, the forwarding element 120A will create, update, and/or delete the flow tables 404 as well as install the configurable logic 406 and the key generation logic 408.

Figure 5:
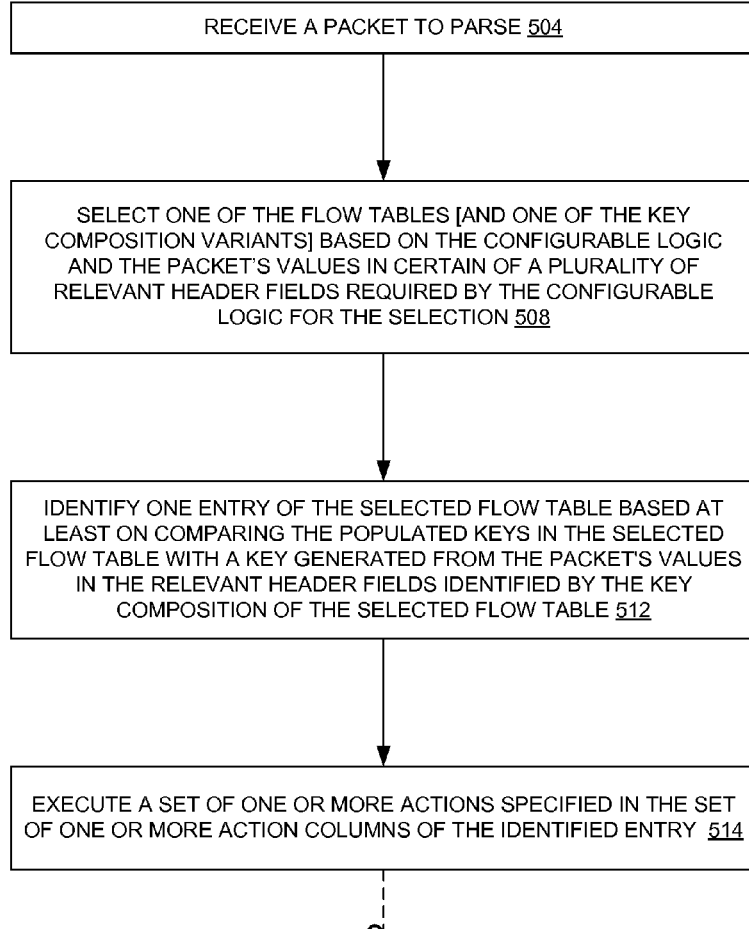
FIG. 5 illustrates a flow diagram of a method in a network element acting as a forwarding element in a software-defined network for making forwarding decisions according to one embodiment of the invention.

FIG. 5 illustrates a flow diagram of a method in a network element acting as a forwarding element (e.g., 120A) in a software-defined network for selecting from the forwarding decisions according to one embodiment of the invention. FIG. 5 depicts a method for selecting from the forwarding decisions for packets 502, received over network interfaces of the network device using one or more protocols, according to the configurable logic for selecting between flow tables 106, the flow tables 140A-140N, and each packet's values in the relevant header fields required by the configurable logic 106 to select one of the flow tables for that packet and to select an entry from the selected flow table for that packet. The forwarding element 120A will first receive 504 a packet to parse. The packet may arrive from a variety of locations, including the forwarding element's 120A network interface or another module in the packet processing pipeline such as the matching and action module 124.

With the packet, the forwarding element 120A will select 508 one of the flow tables (e.g., 140A) based on the configurable logic for selecting between flow tables 106 and the packet's values in certain of a plurality of relevant header fields required by the configurable logic 106 for the selection. In an embodiment, the configurable logic 106 will also select a key composition variant for the selected flow table 140A.

With a selected flow table 140A and a key, the forwarding element 120A will identify 512 one entry (e.g., 179A) of the selected flow table 140A based at least on comparing the populated keys in the selected flow table 140A with a key generated from the packet's values in the relevant header fields identified by the key composition of the selected flow table. With the one entry 179A identified, the forwarding element 120A will execute 514 a set of one or more actions specified in the set of one or more action columns 178 of the identified entry 179A.

In an embodiment, one of the executed actions 178 may require the packet to be reparsed 516 by the packet processing module 122. This may occur, for example, when the packet contains consecutive headers of the same type (e.g., MPLS, etc.), when the packet has been modified by one of the actions, or when a packet's protocol headers are encapsulated by another protocol. In such a scenario, the forwarding element 120A will again select one of the flow tables 508, identify one entry of the selected flow table 512, and execute actions specified by that entry 514.

Figure 6:
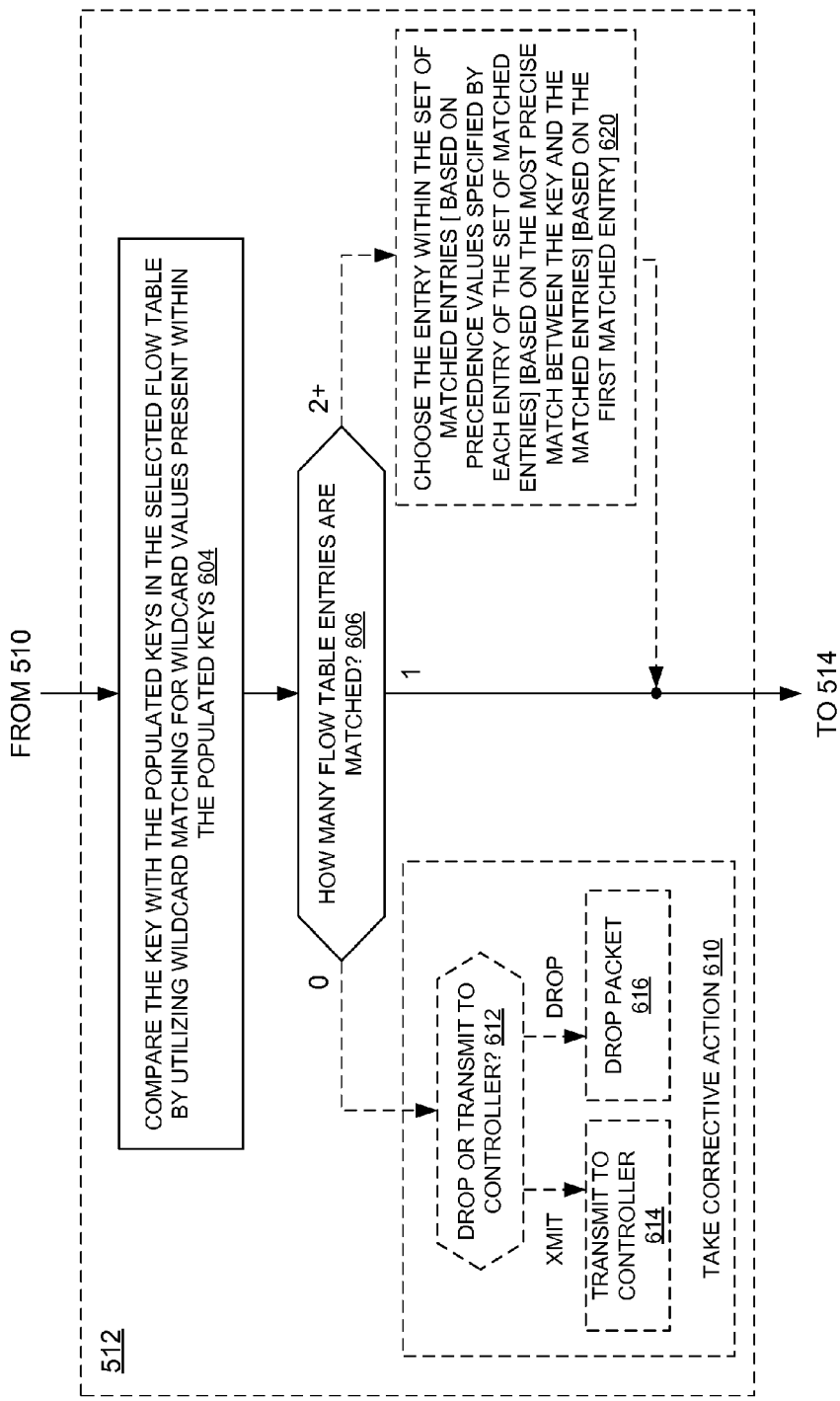
FIG. 6 illustrates a flow diagram of a method in a network element acting as a forwarding element in a software-defined network for identifying flow table entries according to one embodiment of the invention.

FIG. 6 illustrates a flow diagram of a method in a network element acting as a forwarding element (e.g., 120A) in a software-defined network for identifying a flow table entry (e.g., 179A) according to one embodiment of the invention.

After a flow table (e.g., 140A) has been selected and a key has been generated for the packet, the forwarding element 120A will compare 604 the key with the populated keys in the selected flow table 140A by utilizing wildcard matching for wildcard values present within the populated keys. With wildcard matching enabled, it is possible that a key will match the populated keys of more than one flow table entry. So, the forwarding element 120A will determine 606 how many populated keys match the key, which determines how many flow table entries are matched.

If exactly one flow table entry is matched, that entry is the identified entry 512. However, if more than one flow table entry is matched, the forwarding element 120A chooses 620 one entry within the set of matched entries. In an embodiment, this choice occurs based on precedence values specified by each entry of the set of matched entries. For example, the forwarding element 120A may select the entry having a highest precedence value in the set or the entry having the lowest precedence value in the set. In another embodiment, the choice of an entry occurs based on the most precise match between the key and the matched entries. For example, the forwarding element 120A may select the entry with the fewest wildcard values in its configurable key columns 176, indicating it has the most literal key columns 144A-144N in common with the corresponding portions of the key. The chosen flow table entry is then used as the identified entry 512.

If, however, the key does not match any flow table entry, the forwarding element 120A must take corrective action 610. In an embodiment, a decision point 612 occurs where the path of action to occur may be globally set by a system-wide configuration or set on a per flow table basis. In one configuration, upon matching no flow table entries, the forwarding element 120A is to transmit 614 the packet to the controller 110. This enables the controller 110 to analyze the packet and potentially update one or more forwarding elements 120A-120N to enable such a packet to match at least one flow table entry in the future. In an alternate configuration, the forwarding element 120A is to simply drop the packet 616. In a network with well-understood traffic types and users, this configuration may prevent network access to unauthorized devices or prevent unauthorized traffic such as spam, worms, and hacking attacks.

Figure 8:
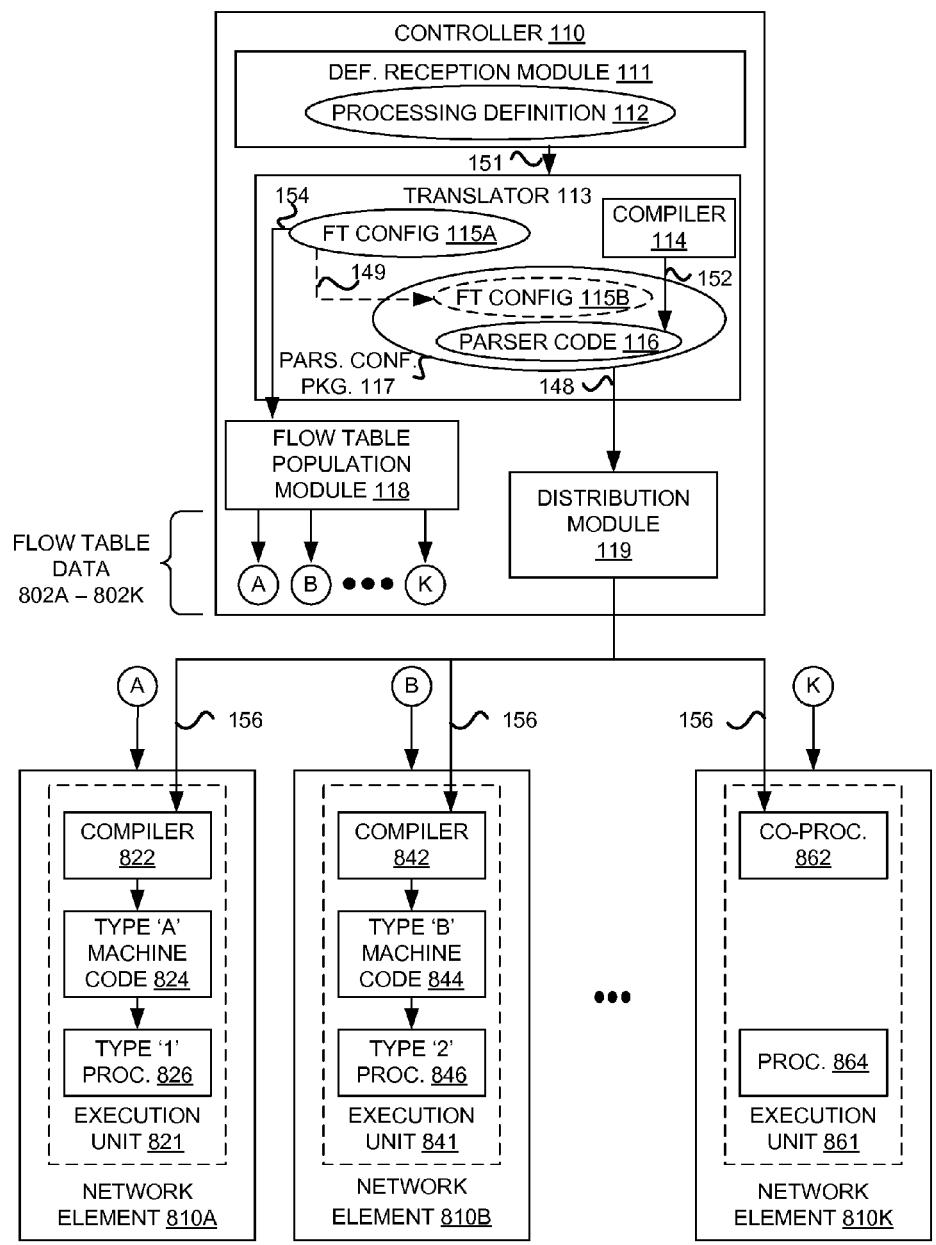
FIG. 8 illustrates an exemplary flexible and extensible flow processing system according to one embodiment of the invention.

FIG. 8 illustrates an exemplary flexible and extensible flow processing system according to one embodiment of the invention including a controller 110 and disparate forwarding elements 810A-810K. The controller 110 includes a definition reception module 111, which receives a processing definition 112. The processing definition 112 includes a representation of configurable definitions of protocols including relevant header fields of protocol headers 104, configurable logic for selecting between flow tables 106, and configurable flow table definitions including key compositions 108. The processing definition 112 is provided 151 to a translator 113, which uses a compiler 114 to produce 152 parser code 116 which becomes part of a parser configuration package 117. The translator 113 also produces flow table configuration 115A information that is used by the flow table population module 118 to populate flow tables 140A-140N. A version of the flow table configuration 115A may be included in the parser configuration package 117. The parser configuration package 117 is ultimately used by each disparate forwarding element 810A-810K to create necessary flow tables 140A-140N and perform packet processing.

The parser configuration package 117 is provided 148 to the distribution module 119, which transmits identical copies 156 of the parser configuration package 117 to the disparate forwarding elements 810A-810K. In this configuration, transmitting identical copies of parser configuration package 117 simplifies the controller 110 as it does not need to be concerned with how to generate native code for various network elements within the network. Alternatively, the controller 110 may be programmed to generate and transmit hardware-specific machine code for one or more forwarding element configurations, in which case a recipient forwarding element (e.g. 810A) would not need a compiler (e.g. 822).

The flow table configuration 115A-115B information generated by the translator 113 is utilized when configuring and populating the flow tables within each of the disparate forwarding elements 810A-810K. Utilizing the flow table configuration 115B (or, in an embodiment, the parser code 116) from the provided 148 parser configuration package 117, each forwarding element 810A-810K is able to define, create, and/or modify the configurable key columns 176 for each flow table because it knows the number of necessary columns as well as the data type for each column. Further, the controller's 110 flow table population module 118 is able to utilize the provided 154 flow table configuration 115A to populate each flow table 140A-140N with flow table entries 179A-179N by sending flow table data 802A-802K.

Unlike the transmitted 156 parser configuration package 117, which is the same for every network element 810A-810K, the flow table population module 118 is operable to send custom flow table data 802A-802K to each network element 810A-810K. Thus, the controller 110 may populate different types of flow table entries on each network element. This provides significant flexibility and power in processing packets within such a software-defined network. For example, edge network elements may easily be configured to process traffic differently than core routers. Further, with dynamic updates through the transmission of this flow table data 802A-802K, a controller 110 can quickly respond to changes in the types or frequencies of traffic within the network by adjusting the flow table entries and corresponding executable actions of one or more of the disparate network elements 810A-810K.

The disparate network elements 810A-810K that receive the parser configuration package 117 and flow table data 802A-802K may utilize different hardware configurations and thus implement packet processing logic in different ways. However, all network elements 810A-810K still receive the same parser configuration package 117. For example, network element 810A contains an execution unit 821 with a compiler 822 and a first type of processor 826. Upon receipt of the parser configuration package 117, the compiler 822 compiles the parser configuration package 117 into a packet parser in native machine instructions, or a first type of machine code 824, for execution on the network element's processor 826. Additionally, a different forwarding element 810B includes an execution unit 841 with a different type of complier 842 for a different type of processor 846. Despite these differences, the network element 810B receives the same parser configuration package 117 as the first network element 810A, compiles it to generate its own custom machine code 844, and executes the machine code 844 on its processor 846 to perform packet processing.

In addition to running on network elements with different processors and compilers (e.g., 810A-810B), the same parser configuration package 117 may also execute on network elements with hardware implementations including specialized co-processors, cores, or integrated circuits. For example, in addition to having a general processor 864, network element 810K has an execution unit 861 including a co-processor 862 able to directly interpret the received 156 parser configuration package 117. Because this co-processor can directly interpret the parser configuration package 117, a compiler for it is unnecessary.

FIG. 9 illustrates an exemplary representation of a processing configuration used in a flexible and extensible flow processing system according to one embodiment of the invention. This figure includes three distinct but interrelated types of information: header instruction representations 904 of configurable definitions of protocols including relevant header fields of protocol headers 104, stack instruction representations 906 of configurable logic for selecting between flow tables and between key composition variants for the selected flow table 906, and table definition instruction representations 902 of configurable flow table definitions including key compositions 108. The formats of these representations according to one embodiment of the invention are detailed below.

Header Instruction Representations

The header instruction representations 904 define the protocols and relevant header fields of each protocol header to be processed for packets in the network. These header instruction representations 904 allow forwarding elements 120A-120N to be dynamically configured to recognize particular protocol headers and therefore be protocol agnostic from a hardware perspective, which allows for ease of modification as new protocols are developed. For example, if a new peer-to-peer (P2P) protocol is developed, the header instruction representations 904 may be easily modified to define the relevant header fields of the protocol and then distributed to the forwarding elements 120A-120N in the network, allowing packets of the new protocol to be properly processed. Additionally, the header instruction representations 904 allow for a focused declaration of the useful (i.e. relevant) fields within each header, as only the fields that might be used in further parsing decisions or used within a key will be identified. This prevents any unnecessary identification or extraction of header fields which would be ultimately useless in the course of processing the packet.

One embodiment of syntax for header instruction representations 904 is presented in Table 2. The first portion of the instruction, which is the word "header", signifies that the instruction is a header instruction. The "header_name" is a value representing a defined name for a header. For example, in FIG. 9 the first header instruction representation 904 is for an Ethernet V2 packet, and the header_name is "etherv2". Next is an optional "length" keyword that will be described momentarily.

TABLE 2

```
header header_name [length = length_expr]
{
    field_type field_name[:field_size];
}
```

Within the curved brackets of the header instruction representation 904 is one or more field declarations for relevant header fields. Each field declaration contains a "field_type" and a "field_name". The "field name" placeholder represents a name for a particular field within the header. For example, in FIG. 9, the first header instruction representation 904 for header "etherv2" includes a "field name" of "dst_addr" that represents a field containing a destination MAC address. The "field_type" placeholder is one of several basic data types used to describe the fields of the header. For example, a "field_type" may be a basic integer type describing an unsigned integer such as uint8_t, uint16_t, uint32_t, or uint64_t. Of course, other data types may be used as well, such as signed integers, characters, floats, or any other data type. In FIG. 9, the first header instruction representation 904 utilizes a "mac_addr_t" type representing a type to store a MAC address and an "int16_t" for a sixteen bit signed integer. Optionally, the "field_type" may also contain the word "field," wherein the field declaration may also include an optional "field_size." In this scenario, the "field_type" of "field" indicates that the value of the header field contains a "field_size" number of bits. For example, the second header instruction representation 904 for header "vlan" includes a "pcp" field of three bits, a "cfi" field of one bit, and a "vid" field of twelve bits. This generic "field" with a "field_size" is also useful for combining multiple fields into one field declaration, particularly if the fields will not be used in later packet processing. For example, consider a scenario where the first four fields of some header are not considered relevant, but the fifth header is. Assuming each of the first four fields of this header are each eight bits in size, and these first four fields are unnecessary for later processing, one field declaration may combine the four fields together by using a "field_type" of "field" and a "field_size" of thirty-two bits.

Turning back to the portion of the instruction before the first curved bracket, an optional "length" keyword and a "length_expr" placeholder allows for the size of the header to be defined using a mathematical expression based on one or more fields of the header. For example, the fourth header instruction representation 904 named "ipv4" defines the size of each "ipv4" header in bytes as four times the value stored in a "hlen" field within the header. The use of this "length" keyword and mathematical expression is particularly useful for processing variable length headers. Additionally, if there are unnecessary (i.e. irrelevant) fields at the end of the header, the header instruction representation 904 may not include them and instead define the total length of the header using the length keyword and an expression. This prevents the packet processing module 122 from identifying and extracting header fields that will not be used again. When the "length" keyword is not specified, the length of the packet is calculated based on the sum of the length of all fields within the header.

Stack Instruction Representations

The stack instruction representations 906 make up the core of the configurable logic for selecting between tables and between key composition variants for the selected flow table 106. In defining how the protocol headers are interrelated and how to flow from one header to the next during processing, the stack instruction representations 906 define which headers will be parsed and therefore what fields will be identified. Further, the stack instruction representations 906 indicate which flow table will be used when classifying the packet based upon the ordering of the headers of the packet and further indicate which key composition will be used to generate a key. When processing a packet, the packet processing module 122 will identify a first header of the packet and begin traversing the headers of the packet according to the stack instruction representations 906.

One embodiment of syntax for stack instruction representations 906 is presented in Table 3. The first portion of the instruction—"stack"—signifies that the instruction is a stack instruction. The next portion of the instruction is a "header_name" with a "key_field." These placeholders indicate what header the stack instruction is to be used for, and which field from that header is to be examined when determining if further headers should be parsed before generating a key and performing classification. For example, in FIG. 9 the first stack instruction representation 906 is to be used when parsing Ethernet version 2 (V2) headers as the header_name is "etherv2". Further, the "ether_type" key_field from the etherv2 header will be the field used when deciding whether to continue parsing additional headers.

TABLE 3

```
stack header_name.key_field [stackable[:stack_depth]]
{
    [table table_id [recursion r_count];]
    [key_value|* next header_name;]
}
```

Next is an optional "stackable" keyword and "stack_depth" value. The optional stackable keyword specifies that multiple instances of the header indicated by this stack instruction may be stacked together in a consecutive sequence. This keyword is particularly useful for describing packets utilizing tunneling and encapsulation, as multiple repeated headers may occur in such scenarios. Optionally, the depth of examination of such repeated headers may be limited by the stack_depth value. In FIG. 9, the third stack instruction representation 906 for "mpls" includes the optional stackable keyword but not a stack_depth value. Therefore, consecutive MPLS headers may be parsed repeatedly until a new, non-MPLS header is detected or some other means of control stops the parsing, such as when the examined "key_field" of an MPLS packet indicates a change in the handling of the packet.

Within the curved brackets are two types of statements: table statements and rules. In an embodiment, at least one statement of one of these two types must exist within the stack instruction. Table statements begin with a table keyword, and are followed by a "table_id" that indicates a unique flow table to be used for the packet classification (i.e. lookup) if parsing of the headers of the packet terminates in this stack instruction. For example, in FIG. 9, the second stack instruction representation 906 for "ipv4" includes a "table 1" statement, so if parsing were to complete while examining this header, a flow table identified by "1" would be used for classification.

Next, an optional "recursion" keyword and "r_count" (recursion count) may be included to indicate that the header indicated by the stack may be returned to during the parsing of packets. In this situation, where a particular type of header is returned to, then the flow table identified by the "table_id" will be utilized for classification and further header parsing will stop. The r_count indicates the point in the header traversal when parsing should stop. Thus, an r_count of 1 indicates that the first time the header is revisited, header parsing should stop and classification should begin. Similarly, an r_count of 2 indicates that the second time the header is revisited, header parsing should stop and classification should begin. For example, if a table statement of "table 1 recursion 1" existed within a stack instruction, upon the first time that stack instruction was revisited header parsing would stop and classification would begin using the flow table identified by the value "1."

The second type of statement within the stack instruction is known as a rule and includes a "key_value" with the word "next" and a "header_name." This rule statement provides the data necessary within the stack used to logically determine if and how header parsing should continue. The value within the header_name.key_field of the packet, which is defined by the first portion of this stack instruction, is compared to each key_value of each of these rules. If the key_field equals the key_value in a rule, parsing will continue with the next header of the packet, which will be of type header_name, and the corresponding stack will be analyzed for further decision making. If more than one rule is declared, each rule will be examined in order, and therefore only one path is possible for a packet. Further, if the key_field does not match any rule's key_value, and if there is no table statement defined for the stack, corrective action will occur. Examples of corrective action include dropping the packet or sending the packet to the controller 110.

For example, in FIG. 9, the first stack instruction representation 906 for "etherv2" contains two rules, and in processing an etherv2 header, the value of its ether_type field will be compared to 0x8847 and 0x0800, in that order. If the ether_type field equals 0x8847, parsing will continue with an "mpls" header. If not, the ether_type field will be compared to 0x0800: if they are equal, parsing will continue with an "ipv4" header, but if they are not equal, the packet may be dropped or forwarded to a controller 110.

The second stack instruction representation 906, for "ipv4", presents a situation where each "next" header does not have a corresponding stack instruction. For example, if the "proto" field equals 0x11, processing is to continue with a "udp" header. However, there is no udp stack instruction representation 906, so the fields of the udp header will be identified using the udp header instruction representation 904, and processing is deemed as complete as of the ipv4 stack instruction representation 906, so "table 1" will be used for classification purposes.

Additionally, a rule may contain a wildcard asterisk (*) in place of a key_value. In this scenario, every key_field will match the asterisk so parsing will continue with the next header packet as indicated by the "next header_name" portion of the rule.

Through the use of the rules and table statements, the parsing paths for recognizable packets are defined and these paths select flow tables for classification and key composition variants to be used during key generation. Despite ending parsing within a stack and being directed to a particular flow table for classification, the order in which stacks were navigated determines a key composition variant for building a key. For example, in FIG. 9, if parsing were to end in the second stack instruction representation 906 for "ipv4", the flow table associated with "table 1" will be used for classification. However, the generated key will differ according to whether the final parsed header was an "udp" header, a "tcp" header, or another type of header, because fields from those headers may be used in the key. Thus, this parsing order will determine a key composition variant, which will be used with the table definition instruction representations 902 described below.

Table Definition Instruction Representations

The table definition instruction representations 902 make up the core of the configurable flow table definitions including key compositions 108. These instructions specify both the type and size of the flow tables used for packet classification. Further, the parsing and classification stages are closely bound as the table definition instruction representations 902 also specify the key compositions and variants used for indexing the flow tables.

One embodiment of syntax for table definition instruction representations 902 is presented in Table 4. The first portion of the instruction includes the word "table" and a unique "table_id" identifier, which together indicate the type of instruction and the unique flow table that the instruction pertains to.

TABLE 4

```
table table_id
{
   field field_id {matching_type} header_name[i].key_field[j];
   [field field_id {matching_type} ?
      header_name[m] : header_name[m].key_field[n],
      header_name[p] : header_name[p].key_field[q];]
}
```

Inside the curved brackets are one or more field statements, each beginning with the word "field" and a "field_id." Each field statement represents one configurable key column 176 in the flow table and one portion of the key for that table. In an embodiment, the field_id is an integer representing the position of the field within the key. Next, within an additional set of curved brackets is a "matching_type." This value may include one or more designations of a type of matching to be allowed within the flow table column when classifying a packet by comparing the key to the columns. For example, the matching_type may include "exact" for requiring an exact match, "1 pm" for using a longest prefix match, "mask" for using a particular mask, or "range" (with two beginning and ending arguments). For example, in FIG. 9, the first table definition instruction representation 902 for "table 0" includes two field statements, each requiring an exact match. In "table 1", four fields require an exact match while fields 2 and 3 allow for a prefix match of 24 bits. After the matching_type, each field statement includes a "header_name" and "key_field", which represents the parsed header that should be used to construct this portion of the key. For example, in FIG. 9, the second table definition instruction representation 902 for "table 1" provides that the first portion of the key should come from the "dst" field of the "etherv2" header of the packet, and that the third portion of the key should come from the "src_addr" field of the "ipv4" header of the packet. The header_name and key_field values may further be specified using brackets to indicate a particular headers or fields that have been parsed. This is particularly useful with header recursion, where the brackets detail a recursion depth enumerating which level of the recursion the values should come from. Similarly, when multiple instances of one header type (or key_field) are located next to one another, this notation allows for the selection of a particular header (or field). For example, in FIG. 9 the first table definition instruction representation 902 for "table 0" provides that the first field will come from a first-parsed MPLS header and the second field will come from a second-parsed MPLS header.

An optional modification of the field statement is also presented in Table 4. In utilizing a question mark with two header/field alternatives (as a logical ternary operator), two key composition variants are defined allowing for different keys to be constructed for the same table. For example, in FIG. 9 the second table definition instruction representation 902 for "table 1" provides two key composition variants because of the field statements for fields 4 and 5. Each of these field statements defines a separate key based upon the path of parsing as defined by the stack instruction representations 906. If a "udp" header was parsed, field 4 will utilize the "udp.dst_port" value and field 5 will utilize the "udp.src_port" values; if a "tcp" header was parsed instead, field 4 will utilize the "tcp.dst_port" value and field 5 will utilize the "tcp.src_port" value. Thus, this ternary field statement provides for key composition variants that are selected based upon the configurable logic for selecting between tables and between key composition variants for the selected flow table 106.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks, optical disks, random access memory, read only memory, flash memory devices, phase-change memory, ternary content-addressable memory (TCAM), etc.) and transitory computer-readable transmission media (e.g., electrical, optical, acoustical or other form of propagated signals—such as carrier waves, infrared signals, digital signals). In addition, such electronic devices typically include a set of one or more processors (e.g., field-programmable gate arrays (FPGA), graphics processing units (GPU), network processing units (NPU), etc.) coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers), rings, or on-chip networks. Thus, the storage device of a given electronic device typically stores code and/or data for execution on the set of one or more processors of that electronic device.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.). Furthermore, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a network device acting as a forwarding element within a software-defined network, comprising:
   receiving, over a network connection with a controller device within the software-defined network, a representation of:
   configurable flow table definitions including key compositions based on a first plurality of relevant header fields of protocol headers, wherein the key composition for each of the configurable flow table definitions identifies a set of one or more of the relevant header fields selected for that flow table definition, and
   configurable logic for selecting, based on a second plurality of relevant header fields of protocol headers, between flow tables defined by the configurable flow table definitions;
   creating a flow table based on each of the configurable flow table definitions, wherein each of the flow tables includes a configurable key column for each of the relevant header fields identified by the key composition included in the flow table definition on which that flow table is based, wherein each of the flow tables also includes a set of one or more action columns to store forwarding decisions;
   installing the configurable logic for selecting between flow tables;
   receiving data to populate the configurable key columns and action columns of the flow tables;
   populating the flow tables according to the received data; and
   selecting from the forwarding decisions for packets, received over network interfaces of the network device using one or more protocols, according to the configurable logic for selecting between flow tables, the flow tables, and each packet's values in the relevant header fields required by the configurable logic to select one of the flow tables for that packet and to select an entry from the selected flow table for that packet.

2. The method of claim 1, wherein selecting from the forwarding decisions comprises the following for a first of the packets:
   accessing the first packet's values in the second plurality of relevant header fields as needed for the configurable logic to select one of the flow tables; and
   generating a key for the selected flow table based on the first packet's values in the relevant header fields identified by the key composition of the selected flow table.

3. The method of claim 1, further comprising:
   receiving, over the network connection with the controller device within the software-defined network, a representation of key generation logic to generate keys according to the key compositions, from the packets' values for comparison to entries of the flow tables; and
   installing the key generation logic.

4. The method of claim 1, further comprising creating key generation logic to generate keys, according to the key compositions, from the packets' values for comparison to entries of the flow tables.

5. The method of claim 1, wherein the step of selecting from the forwarding decisions comprises the following for a first of the packets:
   selecting one of the flow tables based on the configurable logic and the first packet's values in certain of the second plurality of relevant header fields required by the configurable logic for the selection;
   identifying one entry of the selected flow table based at least on comparing the populated keys in the selected flow table with a key generated from the first packet's values in the relevant header fields identified by the key composition of the selected flow table; and
   executing a set of one or more actions specified in the set of one or more action columns of the identified one entry.

6. The method of claim 5, wherein selecting one of the flow tables further comprises selecting a key composition variant based on the configurable logic for selecting between flow tables and the protocol headers in the first packet identified by the configurable logic.

7. The method of claim 5, wherein selecting from the forwarding decisions further comprises transmitting packets to the controller device that do not match any of the entries of the flow table selected for those packets.

8. The method of claim 5, wherein comparing the populated keys in the selected flow table with the generated key is performed utilizing wildcard matching for wildcard values present within the populated keys.

9. The method of claim 8, wherein identifying one entry of the selected flow table further comprises, in response to matching a set of two or more entries of the selected flow table, choosing an entry of the matched set of entries based on precedence values specified by the matched set of entries.

10. The method of claim 8, wherein identifying one entry of the selected flow table further comprises, in response to matching a set of two or more entries of the selected flow table, choosing an entry of the matched set of entries based on a most precise match between the key and the matched set of entries.

11. A network device to act as a flow switching enabled forwarding element, comprising:
a configuration module operable to:
receive a representation of:
configurable flow table definitions including key compositions based on a first plurality of relevant header fields of protocol headers, wherein the key composition for each of the configurable flow table definitions identifies a set of one or more of the relevant header fields selected for that flow table definition, and
configurable logic for selecting, based on a second plurality of relevant header fields of protocol headers, between a plurality of flow tables defined by the configurable flow table definitions, and
install the configurable logic for selecting between the plurality of flow tables;
a flow table management module operable to:
create a flow table based on each of the configurable flow table definitions, wherein each of the flow tables is to include a configurable key column for each of the relevant header fields identified by the key composition included in the flow table definition on which that flow table is based, wherein each of the flow tables is to include a set of one or more action columns to store forwarding decisions,
receive data to populate the configurable key columns and actions columns of the flow tables, and
populate the flow tables according to the received data; and
a packet processing module operable to select from the forwarding decisions for packets, received over network interfaces of the network device, according to the configurable logic for selecting between the plurality of flow tables, the flow tables, and each packet's values in those of the relevant header fields required by the configurable logic to select one of the flow tables for that packet and to select an entry from the selected flow table for that packet.

12. The network device of claim 11, wherein the packet processing module further comprises:
a parsing module, comprising:
a decision module operable to select for each packet one of the flow tables based on the configurable logic and each packet's values in certain of the second plurality of relevant header fields required by the configurable logic for the selection, and
a key generation module operable to receive for each packet the indication of the selected flow table from the decision module and configured to generate for each packet a key from that packet's values in the relevant header fields identified by the key composition of the selected flow table; and
a matching and action module operable to receive, for each packet, an indication of the selected flow table and the key from the key generation module and configured to:
identify one entry of the selected flow table based at least on comparing the key with the populated keys in the selected flow table, and
execute a set of one or more actions specified by the identified one entry.

13. The network device of claim 12, wherein:
the decision module is further configured to select, when required by the configurable logic for a given packet, a key composition variant based on the protocol headers within the given packet identified by the configurable logic; and
the key generation module is further configured to generate the key for the given packet based upon the selected key composition variant.

14. The network device of claim 12, wherein the matching and action module is configured, in response to matching zero entries of the selected flow table when comparing the key with the populated keys in the selected flow table, to transmit that packet to a controller device.

15. The network device of claim 12, wherein the configuration module is also operable to:
receive a representation of key generation logic; and
install the key generation logic in the key generation module.

16. The network device of claim 12, wherein the key generation module is further configured to create key generation logic from the representation of the configurable flow table definitions.

17. The network device of claim 12, wherein the matching and action module is configured to compare the keys with the populated keys in the selected flow tables by utilizing wildcard matching for wildcard values present within the populated keys.

18. The network device of claim 17, wherein the matching and action module, in response to matching a set of two or more entries of the selected flow table when comparing the key with the populated keys in the selected flow table, is configured to choose between the matched set of entries based on precedence values specified by the matched set of entries.

19. The network device of claim 17, wherein the matching and action module, in response to matching a set of two or more entries of the selected flow table, is configured to choose between the matched set of entries based on a most precise match.

20. The network device of claim 17, wherein the matching and action module is configured to identify the one entry of the selected flow table by, upon first determining that a first flow table entry has a populated key that matches the key, selecting that first flow table entry as the identified one entry.

* * * * *